(12) United States Patent
Guo et al.

(10) Patent No.: US 10,952,080 B2
(45) Date of Patent: Mar. 16, 2021

(54) SPECTRUM MANAGEMENT DEVICE AND METHOD, GEOGRAPHIC LOCATION DATABASE AND SUBSYSTEM

(71) Applicants: Xin Guo, Beijing (CN); Sony Corporation, Tokyo (JP)

(72) Inventors: Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 91 days.

(21) Appl. No.: 16/300,061

(22) PCT Filed: Apr. 18, 2017

(86) PCT No.: PCT/CN2017/080866
§ 371 (c)(1),
(2) Date: Nov. 9, 2018

(87) PCT Pub. No.: WO2017/198024
PCT Pub. Date: Nov. 23, 2017

(65) Prior Publication Data
US 2019/0098510 A1 Mar. 28, 2019

(30) Foreign Application Priority Data
May 17, 2016 (CN) .......................... 201610327223.8

(51) Int. Cl.
*H04W 16/14* (2009.01)
*H04W 72/04* (2009.01)
(Continued)

(52) U.S. Cl.
CPC .......... *H04W 16/14* (2013.01); *H04W 48/16* (2013.01); *H04W 72/0453* (2013.01); *H04W 72/082* (2013.01); *H04L 27/0006* (2013.01)

(58) Field of Classification Search
CPC . H04W 16/14; H04W 48/16; H04W 72/0453; H04W 72/082; H04L 27/0006
See application file for complete search history.

(56) References Cited

U.S. PATENT DOCUMENTS

2008/0108365 A1* 5/2008 Buddhikot .......... H04W 72/048
455/452.1
2009/0059820 A1* 3/2009 Jung .................... H04L 5/0005
370/280
(Continued)

FOREIGN PATENT DOCUMENTS

CN 103250454 A 8/2013
CN 103974261 A 8/2014
(Continued)

OTHER PUBLICATIONS

English-language Translation of International Search Report and Written Opinion for International Application No. PCT/CN2017/080866, dated Jul. 7, 2017.
(Continued)

*Primary Examiner* — Brian P Cox
(74) *Attorney, Agent, or Firm* — Xsensus, LLP

(57) ABSTRACT

Provided in the present disclosure are a spectrum management device and method, a geographic location database, a coexistence discovery device, and subsystems for use in a radio communication system comprising a main system and subsystems. The spectrum management device comprises: a processing circuit, which is configured to: acquire spectrum usage information and spectrum adjustment capability information of subsystems managed by the spectrum management device, the spectrum usage information corresponding to information related to used spectrums assigned to and used by each subsystem, the spectrum adjustment capability information corresponding to information related to whether the subsystems support a spectrum adjustment operation, and an adjustment of the spectrums of the subsystems managed by the spectrum management device is determined on the basis of the spectrum usage information and the spectrum adjustment capability information, thus the interference caused by the subsystems as a result of spectrum
(Continued)

usage to the main system is limited within a permissible range of the main system. The spectrum management device and method, the geographic location database, the coexistence discovery device, and the subsystems of the present disclosure achieve highly efficient use of spectrum resources.

20 Claims, 19 Drawing Sheets

(51) Int. Cl.
*H04W 48/16* (2009.01)
*H04W 72/08* (2009.01)
*H04L 27/00* (2006.01)

(56) References Cited

U.S. PATENT DOCUMENTS

| | | |
|---|---|---|
| 2010/0330919 A1 | 12/2010 | Gurney et al. |
| 2012/0057533 A1 | 3/2012 | Junell et al. |
| 2015/0319622 A1 | 11/2015 | Sun |
| 2016/0056908 A1* | 2/2016 | Sun .................. H04W 72/0453 370/329 |
| 2016/0088485 A1 | 3/2016 | Guo et al. |
| 2016/0088636 A1* | 3/2016 | Zhao ..................... H04W 16/14 455/454 |

FOREIGN PATENT DOCUMENTS

| | | |
|---|---|---|
| CN | 104219674 A | 12/2014 |
| EP | 2996412 A1 | 3/2016 |
| WO | 2010/022156 A2 | 2/2010 |

OTHER PUBLICATIONS

Extended European Search Report dated Mar. 19, 2019 in corresponding EP Application No. 17798588.4, 9 pages.

Xin Guo et al, "Text proposal on the low latency resource reassignment for coexistence management" dated May 17, 2016, IEEE 802.19.1a, 6 pages.

Xin Guo et al., "Low Complexity Resource Reassignment for Coexistence Management" dated Apr. 25, 2016, IEEE 802.19-16, 11 pages.

* cited by examiner

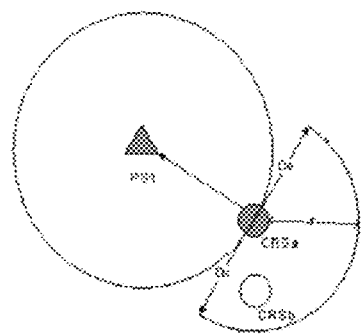
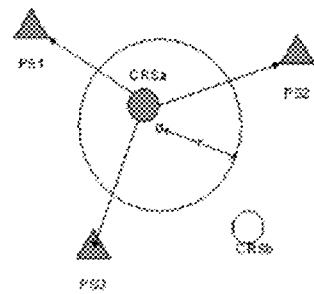
Figure 7(a)
Figure 7(b)
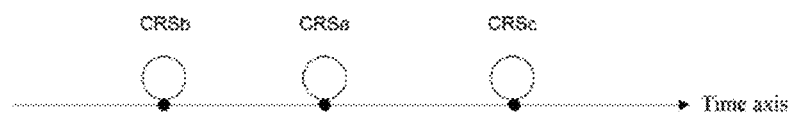
Figure 8

SPECTRUM MANAGEMENT DEVICE AND METHOD, GEOGRAPHIC LOCATION DATABASE AND SUBSYSTEM

CROSS-REFERENCE TO RELATED APPLICATIONS

This application is a National Stage Application based on PCT/CN2017080866, filed 18 Apr. 2017, and claims priority to Chinese Patent Application No. 201610327223.8, filed 17 May 2016, the entire contents of which being incorporated herein by reference.

The present application claims priority to Chinese Patent Application No. 201610327223.8, titled "SPECTRUM MANAGEMENT DEVICE AND METHOD, GEOGRAPHIC LOCATION DATABASE AND SUBSYSTEM", filed on May 17, 2016 with the China National Intellectual Property Administration, which is incorporated herein by reference in its entirety.

FIELD

The present disclosure relates to management of spectrum resources in wireless communication, and in particular to a spectrum management device, a spectrum management method, a geo-location database, a cognitive radio system and a wireless communication method for a wireless communication system including a primary system and a cognitive radio system.

BACKGROUND

With the rapid development of the computer and communication technology, the global information network evolves rapidly towards a next generation network (NGN) that is based on protocols for interconnection between networks (IP). An important feature of the NGN is that multiple types of wireless technologies coexist to form a heterogeneous wireless access network, and the heterogeneous wireless access network involves different priorities in usage of spectrum resources. The spectrum management relates to a primary system and a cognitive radio system (CRS). For example, a network operating at a television frequency band includes a primary system and a cognitive radio system. The primary system has licensed authorization to the television frequency band, and the cognitive radio system does not have licensed authorization to the television frequency band. The cognitive radio system can share the television frequency band with the primary system only when interference of the cognitive radio system to the primary system falls within a permissible range.

Therefore, when a new cognitive radio system or a new service of an existing cognitive radio system requests resource allocation, spectrum resource usage states of both the primary system and the existing cognitive radio system(s) Should be considered. With the operating of the network, states of systems change continuously, and the resource utilization rate of spectrum resource allocation is reduced, resulting in that no more cognitive radio system can gain access when the capacity limit is not yet reached. In order to solve the above problem, there is a simple solution in which resource reallocation and system reconfiguration are performed on all cognitive radio systems. However, this system reconfiguration to a large number of cognitive radio systems results in a great overhead.

SUMMARY

The brief summary of the present disclosure is given in the following, so as to provide basic understanding on certain aspects of the present disclosure. It should be understood that, the summary is not exhaustive summary of the present disclosure. The summary is neither intended to determine key or important parts of the present disclosure, nor intended to limit the scope of the present disclosure. An object of the present disclosure is to provide some concepts in a simplified form, as preamble of the detailed description later.

In view of the defects of the conventional technology, an object of the present disclosure is to provide a spectrum management device and method, a geo-location database and a cognitive radio system for a wireless communication system including a primary system and a cognitive radio system, to at least solve the problem in the conventional technology.

According to an embodiment of the present disclosure, a spectrum management device for a wireless communication system including a primary system and a cognitive radio system is provided. The spectrum management device includes a processing circuit. The processing circuit is configured to: acquire spectrum usage information and spectrum transition capability information of the cognitive radio system managed by the spectrum management device, wherein the spectrum usage information corresponds to information on a usage spectrum allocated for use by each cognitive radio system, and the spectrum transition capability information corresponds to information on whether the cognitive radio system supports a spectrum transition operation; and determine spectrum transition to each cognitive radio system managed by the spectrum management device based on the spectrum usage information and the spectrum transition capability information, so that interference caused by spectrum usage of each cognitive radio system to the primary system falls within a permissible range of the primary system.

According to another embodiment of the present disclosure, a cognitive radio system for a wireless communication system is provided, which includes a communication unit. The communication unit is configured to send spectrum usage information and spectrum transition capability information of the cognitive radio system for determining spectrum transition to the cognitive radio system based on the spectrum usage information and the spectrum transition capability information, and receive spectrum transition information for adjusting spectrum usage of the cognitive radio system, wherein the spectrum usage information corresponds to information on a usage spectrum allocated for use by each cognitive radio system, and the spectrum transition capability information corresponds to information on whether the cognitive radio system supports a spectrum transition operation.

According to another embodiment of the present disclosure, a geographic location database for a wireless communication system including a primary system and a cognitive radio system is provided. The geographic location database includes a communication unit. The communication unit is configured to provide spectrum usage information and spectrum transition capability information of each cognitive radio system, wherein the spectrum usage information corresponds to information on a usage spectrum allocated for use by each cognitive radio system, and the spectrum transition capability information corresponds to information on whether the cognitive radio system supports a spectrum transition operation; and wherein the spectrum usage information and the spectrum transition capability information are used to determine spectrum transition to the cognitive radio system in the wireless communication system.

According to another embodiment of the present disclosure, a coexistence discovery device for a wireless communication system including a primary system and a cognitive radio system is provided. The coexistence discovery device includes a processing circuit. The processing circuit is configured to, in a case that there is a cognitive radio system making a request for a spectrum resource and there is a remaining spectrum resource in the wireless communication system that is unavailable to the cognitive radio system making the request for the spectrum resource without any change to spectrum resource allocation of other cognitive radio systems, determine whether to trigger the spectrum transition to the cognitive radio system in the wireless communication system in response to the request, so that a spectrum management device for managing the cognitive radio system acquires spectrum transition capability information of the cognitive radio systems managed by the spectrum management device in a case that it is determined to trigger the spectrum transition to the cognitive radio systems in the wireless communication system, and determines spectrum transition to the cognitive radio systems managed by the spectrum management device based on the spectrum transition capability information of the cognitive radio systems, with the spectrum transition capability information corresponding to information on whether the cognitive radio system supports a spectrum transition operation.

According to another embodiment of the present disclosure, a spectrum management method for a wireless communication system including a primary system and a cognitive radio system is provided. The spectrum management method includes: acquiring spectrum usage information and spectrum transition capability information of the cognitive radio systems managed by the spectrum management device, wherein the spectrum usage information corresponds to information on a usage spectrum allocated for use by each cognitive radio system, and the spectrum transition capability information corresponds to information on whether the cognitive radio system supports a spectrum transition operation; and determining spectrum transition to the cognitive radio systems managed by the spectrum management device based on the spectrum usage information and the spectrum transition capability information, so that interference caused by spectrum usage of each cognitive radio system to the primary system falls within a permissible range of the primary system.

According to another embodiment of the present disclosure, a method for a wireless communication system including a geographic location database, a spectrum management device and a cognitive radio system is provided. The method includes: sending, by the geographic location database, spectrum usage information and transition capability information of each cognitive radio system in response to a spectrum resource request from the cognitive radio system, wherein the spectrum usage information corresponds to information on a usage spectrum allocated for use by each cognitive radio system, and the spectrum transition capability information corresponds to information on whether the cognitive radio system supports a spectrum transition operation, and receiving, by the spectrum management device, the spectrum usage information and the spectrum transition capability information of the cognitive radio system managed by the spectrum management device, and determining, by the spectrum management device, spectrum transition to the cognitive radio system managed by the spectrum management device based on the spectrum usage information and the spectrum transition capability information, so that interference caused by spectrum usage of each cognitive radio system to a primary system in the wireless communication system falls within a permissible range of the primary system; sending, by the spectrum management device, spectrum transition information on the spectrum transition; and receiving, by the cognitive radio system, the spectrum transition information sent from the spectrum management device, and adjusting, by the cognitive radio system, spectrum usage of the cognitive radio system based on the spectrum transition information.

In addition, a computer pro am for implementing the spectrum management method described above is further provided according to an embodiment of the present disclosure.

In addition, a corresponding computer readable storage medium is further provided according to an embodiment of the present disclosure. The computer readable medium has stored thereon computer program codes for implementing the spectrum management method described above.

With the spectrum management device and method, the geographic location database, the coexistence discovery device and the cognitive radio system according to the embodiments of the present disclosure, at least the following beneficial effect can be achieved: more cognitive radio systems can gain access with less reconfiguration overhead, thereby utilizing the spectrum resources efficiently.

According to the detailed description of preferred embodiments of the present disclosure in conjunction with the drawings below, these and other advantages of the present disclosure will become more apparent.

BRIEF DESCRIPTION OF THE DRAWINGS

The present disclosure may be understood better with reference to the following description in conjunction with the drawings. Throughout all the drawings, the same or similar reference numerals indicate the same or similar component. The drawings and the detailed description in the following are included in the specification and form a part of the specification, and are used to illustrate preferred embodiments of the present disclosure and explain principles and advantages of the present disclosure by examples. Among the drawings.

FIG. 7a and FIG. 7b schematically show an example of determining a cognitive radio system set based on movable ranges of cognitive radio systems;

FIG. 8 schematically shows an example of determining a cognitive radio system set based on a time when usage spectrum is allocated to the cognitive radio system;

Figure 1:
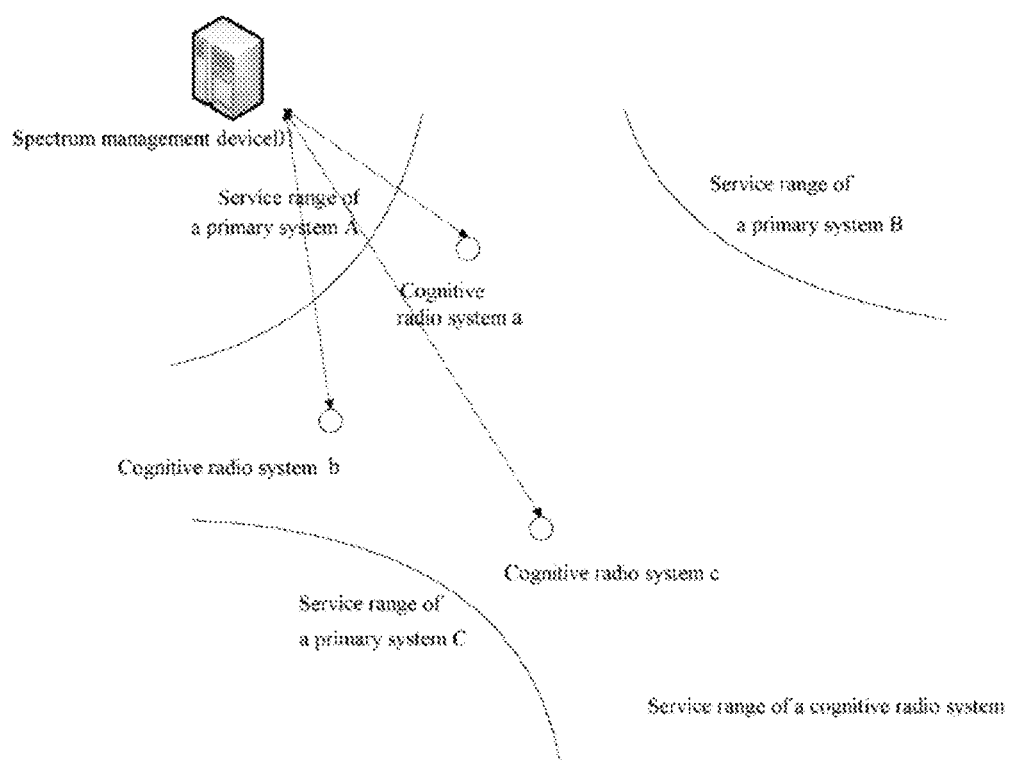
FIG. 1 shows a schematic diagram of an example of a communication system including a primary system and a cognitive radio system.

It should be understood by those skilled in the art that elements in the drawings are shown for simple and clearance only, and are not necessarily drawn to the scale. For example, sizes of certain elements in the drawings may be amplified relative to other elements, for assisting understanding of the embodiments of the present disclosure.

DETAILED DESCRIPTION OF EMBODIMENTS

Schematic embodiments are described in conjunction with the drawings in the following. For clearness and clarity, not all features of actual embodiments are described in the specification. However, it should be understood that during a process of developing any such embodiment, many decisions specific to the embodiments have to be made, to achieve a specific target of an actual developer, for example, conforming to limitation conditions related to a system and a service. The limitation conditions may change for different embodiments. In addition, it should be understood that although the developing work may be complicated and time-consuming, the developing work is only a routine task for those skilled in the art benefitting from the present disclosure.

Here, it should be noted that in order to avoid obscuring the present disclosure due to unnecessary details, only device structures and/or processing steps closely related to the solution of the present disclosure are shown in the drawings, and other details less closely related to the present disclosure are omitted.

For a communication system including a primary system and a cognitive radio system, in order to reduce interference between the primary system and the cognitive radio system in the same or adjacent spectrum while utilizing the spectrum resources reasonably, a method for optimizing spectrum usage of the cognitive radio system without causing an interference to the primary system is provided according to the present disclosure, so as to utilize the limited spectrum resource sufficiently. Generally, the primary system includes a primary base station and a primary user, and the cognitive radio system includes a secondary base station and a secondary user. According to the present disclosure, the primary system may be a system having licensed spectrum use, and the cognitive radio system may be a system having no licensed spectrum use. According to another embodiment of the present disclosure, the primary system and the cognitive radio system each have licensed spectrum use, and the primary system has a priority in using the spectrum. In this case, the cognitive radio system can share the licensed spectrum with the primary system only when the cognitive radio system causes no harmful interference to the primary system. Conceptions of the primary system and the cognitive radio system are well-known in the art, which are not described in detail here.

FIG. 1 shows a schematic diagram of an example of a communication system including a primary system and a cognitive radio system.

The communication system shown in FIG. 1 includes three primary systems A, B and C, three cognitive radio systems a, b and c, and a spectrum management device D1 for managing spectrum resources of the cognitive radio systems.

The communication system shown in FIG. 1 is only schematic. It should be understood by those skilled in the art that the number of the primary systems and the number of the cognitive radio systems included in the communication system are not limited, and the communication system may include, for example, two primary systems or more than four primary systems.

It should be noted here that, for the communication system including the primary system and the cognitive radio system, in a case that spectrum resources are to be adjusted when a network state changes (for example, there is a cognitive radio system with a new demand for a source and it is required to allocate a spectrum resource for the cognitive radio system), at least external constraint conditions should be met. That is, interference caused by spectrum resource usage of the cognitive radio system to the primary system (for example the primary system A, B or C in FIG. 1) falls within a permissible range of the primary system.

In addition, in a case that there are multiple cognitive radio systems, when spectrum resources are allocated to a cognitive radio system requesting a resource, it should be ensured that aggregation interference caused by spectrum resource usage of all cognitive radio systems to the primary system falls within the permissible range of the primary system. Therefore, in the present disclosure, when it is stated that the interference caused by spectrum resource usage of a cognitive radio system requesting the spectrum resource to the primary system falls within a permissible range of the primary system, it is intended to indicate a case that the aggregation interference of all cognitive radio systems including the cognitive radio system to the primary system falls within the permissible range, when the cognitive radio system uses the allocated spectrum resource and other cognitive radio systems in the current communication system use their allocated spectrum resources (that is, spectrum resources that they are currently using). Those skilled in the art may calculate the aggregation interference of the cognitive radio systems to the primary system by any method in the conventional technology, and the specific calculation method is not described here.

Figure 2:
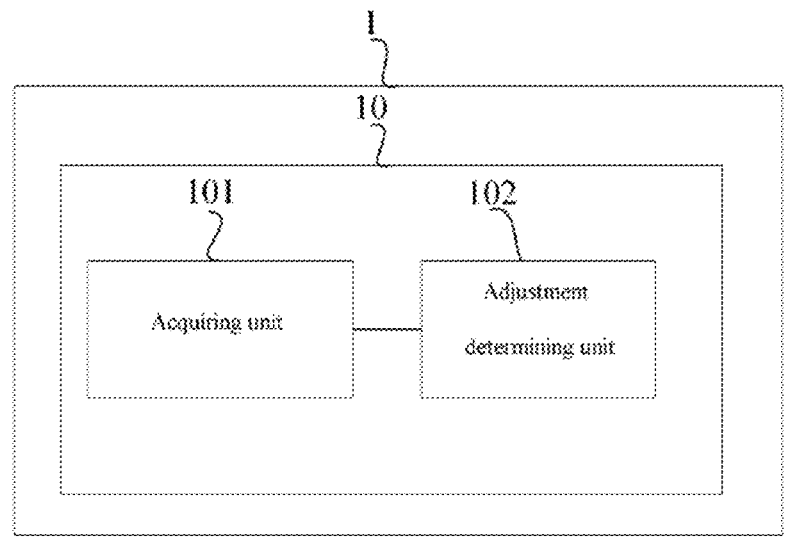
FIG. 2 shows a structural block diagram of a spectrum management device for a wireless communication system according to an embodiment of the present disclosure.

FIG. 2 shows a spectrum management device 1 for a wireless communication system according to an embodiment of the present disclosure. The wireless communication system includes a primary system and a cognitive radio system. The spectrum management device 1 includes a processing circuit 10. The processing circuit 10 is configured to: acquire spectrum usage information and spectrum transition capability information of cognitive radio systems managed by the spectrum management device, wherein the spectrum usage information corresponds to information on usage spectrum allocated for use by each of the cognitive radio systems, and the spectrum transition capability information corresponds to information on whether the cognitive radio system supports a spectrum transition operation; and determine spectrum transition to the cognitive radio systems managed by the spectrum management device based on the spectrum usage information and the spectrum transition capability information, so that interference caused by spectrum usage of each of the cognitive radio systems to the primary system falls within a permissible range of the primary system. According to the present disclosure, the spectrum management device 1 may be provided independently from the geo-location database (GLDB) or provided in the geo-location database.

According to the present disclosure, the spectrum usage information is information on spectrums allocated for use by each cognitive radio systems. The spectrum allocated for use by each cognitive radio system may be used by the cognitive radio system, or may be not used or only used partially since the cognitive radio system needs no resource currently. The processing circuit 10 of the spectrum management device 1 may acquire spectrum usage information of the cognitive radio systems from the geo-location database (GLDB) or the cognitive radio systems, for example. The geo-location database is defined and the spectrum usage information is acquired by the database according to the conventional technology, which is not described here. In addition, the spectrum management device 1 may be configured to allocate spectrum resources to the cognitive radio systems, therefore the spectrum management device 1 can maintain spectrum resources allocated to each cognitive radio system. For example, the spectrum management device 1 may store information on spectrum resources allocated for use by each cognitive radio system in its storing unit, and thus the processing circuit 10 can acquire the spectrum usage information of the cognitive radio system from the storing unit of the spectrum management device 1.

The spectrum transition capability information indicates a spectrum transition capability of the cognitive radio system. A heterogeneous wireless access network supports a large number of and multiple types of cognitive radio systems which may have different QoS requirements. For example, the cognitive radio system may be a single mobile device or a network consisting of mobile devices. Therefore, reconfiguration of the different cognitive radio system generates different overheads, resulting in differences in sensitivity for the reconfiguration caused by the spectrum transition. With the spectrum transition capability information, the cognitive radio system can determine whether to perform a spectrum transition operation based on its own features or requirements. The features or requirements include: significance of the service, whether benefit (for example, exchanging for virtual currency or traffic) can be generated by performing spectrum transition, or the like. The spectrum transition capability information may be dynamically set by the cognitive radio system during operating based on its own features or requirements. For example, the spectrum transition capability information may be indicated by spectrumTransitionCapability. A value of the spectrum transition capability information may be indicated by a Boolean value. For example, "TRUE" indicates that the cognitive radio system supports the spectrum transition operation; otherwise, it is indicated that the cognitive radio system refuses performing the spectrum transition operation. Similar to the spectrum usage information, the processing circuit 10 may acquire the spectrum transition capability information of the cognitive radio systems from the geo-location database, the cognitive radio systems or the storing unit of the spectrum management device.

In addition, FIG. 2 further shows an example of functional modules of the processing circuit 10. As shown in FIG. 2, the processing circuit 10 includes an acquiring unit 101 and a transition determining unit 102. It should be understood that, the functional modules may be respectively implemented by separate processing circuits, may be collectively implemented by one processing circuit or may be implemented as a part of one processing circuit. Alternatively, each of the functional modules may be implemented by multiple processing circuits. In other words, the implementation of the functional modules is not limited. The processing circuit 10 may be realized as a central processing unit (CPU) with data processing capability, a microprocessor and an integration circuit module and so on, for example. Hereinafter, structures and functions of the spectrum management device 1 are described in detail with reference to FIG. 3.

In an example, the processing circuit 10 may be further configured to, in a case that there is a cognitive radio system requesting a spectrum resource and there is a remaining spectrum resource in the wireless communication system, acquire spectrum usage information of the cognitive radio system managed by the spectrum management device in response to the request, and determine whether to trigger spectrum transition to the cognitive radio system based on the spectrum usage information of the cognitive radio system managed by the spectrum management device, so as to meet spectrum resource usage of the cognitive radio system requesting the spectrum resource.

According to the present disclosure, the remaining spectrum resource may be spectrum resources for which an upper limit of the user usage is not reached, which may include a spectrum resource unused, a newly released spectrum resource and other spectrum, resource for which the upper limit of the user usage is not reached in the wireless communication system. For example, there is a spectrum resource in the wireless communication system that may allow usage by at most ten cognitive radio systems when interference of the cognitive radio systems to the primary system is within an interference threshold range, and only five cognitive radio systems are currently using the spectrum resource. In this case, spectrum resource usage does not reach an upper limit of permissible users (that is, the spectrum resource is not utilized sufficiently, and the usage of the spectrum resource can be adjusted). In the following description, the spectrum resource for which the upper limit of the user usage is not reached, other than the spectrum resource unused and the newly released spectrum resource in the wireless communication system, is referred to as other spectrum resources for which the upper limit of the user usage is not reached.

Figure 3:
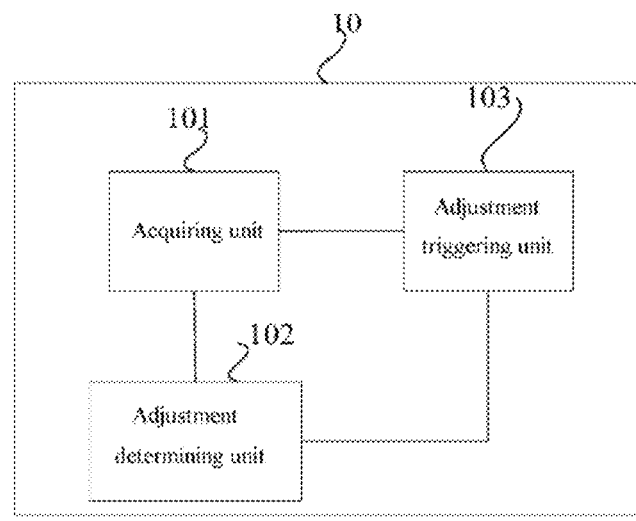
FIG. 3 is a block diagram showing another structure example of a processing circuit in FIG. 2.

Accordingly, as shown in FIG. 3, the processing circuit 10 may further include an transition triggering unit 103, which is configured to determine whether to trigger spectrum transition to the cognitive radio system, so as to meet spectrum resource usage of the cognitive radio system requesting the spectrum resource.

According to the present disclosure, in a case that there is a cognitive radio system requesting a spectrum resource and there is a remaining spectrum resource in the wireless communication system, the transition triggering unit 103 can determine whether to trigger a spectrum resource trigger operation of the cognitive radio system in response to the spectrum resource request.

Figure 4:
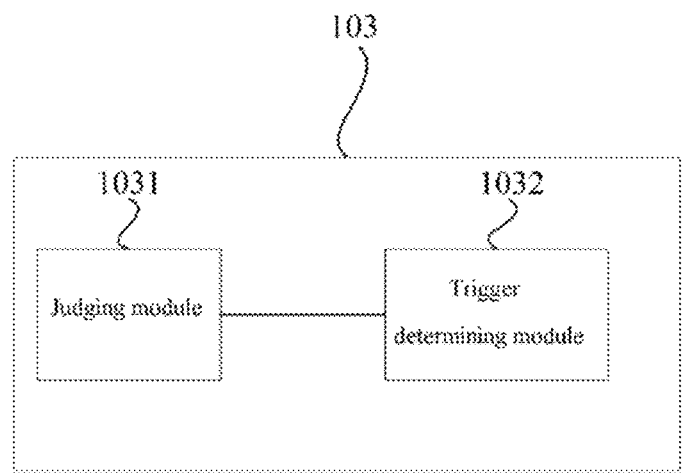
FIG. 4 is a block diagram showing an exemplary structure of a transition triggering unit in FIG. 3.

FIG. 4 shows an exemplary structure of a transition triggering unit.

As shown in FIG. 4, the transition triggering unit 103 may include a judging module 1031 and a trigger determining module 1032. The judging module 1031 is configured to judge whether there is a remaining spectrum resource in the wireless communication system and whether the remaining spectrum resource can be used by a cognitive radio system requesting a spectrum resource. The trigger determining module 1032 is configured to determine triggering transition to spectrum usage of the cognitive radio systems, in a case that the judging module 1031 determines that there is a remaining spectrum resource in the wireless communication system and the remaining spectrum resource cannot be used by the cognitive radio system requesting the spectrum resource.

According to an embodiment of the present disclosure, the judging module 1031 may firstly judge whether the remaining spectrum resource in the wireless communication system can be used by cognitive radio system requesting the spectrum resource. For example, the judging module 1031 may judge whether the remaining spectrum resource is available for the cognitive radio system requesting the spectrum resource. If the remaining spectrum resource is available for the cognitive radio system requesting the spectrum resource, the judging module 1031 can determine that the remaining spectrum resource can be used by the cognitive radio system requesting the spectrum resource, and thus the processing circuit 10 can determine to allocate the remaining spectrum resource to the cognitive radio system. The judging module 1031 may perform the above judgment based on a list of available spectrums for the cognitive radio system requesting the spectrum resource that is acquired from the geo-location database by the acquiring unit 101. The list of available spectrums according to the present disclosure includes information on available spectrums for the cognitive radio system in a case that the interference of the cognitive radio system to the primary system is within the permissible range of the primary system. Alternatively, the judging module 1031 judges whether the interference to the primary system is within an interference threshold range of the primary system when the cognitive radio system requesting the spectrum resource uses the remaining spectrum resource. It the interference is within the interference threshold range of the primary system, the judging module 1031 can determine that the remaining spectrum resource can be used by the cognitive radio system requesting the spectrum resource, and thus the processing circuit 10 can determine to allocate the remaining spectrum resource to the cognitive radio system requesting the spectrum resource.

In a case that the judging module 1031 determines that the cognitive radio system requesting the spectrum resource can acquire the remaining spectrum resource, the remaining spectrum resources can be allocated to the cognitive radio system requesting the spectrum resource without spectrum transition of the cognitive radio system. Therefore, the trigger determining module 1032 determines not to trigger transition to spectrum usage of the cognitive radio systems and determines that the remaining spectrum resource can be allocated to the cognitive radio system requesting the spectrum resource.

In contrast, when the judging module 1031 determines that the cognitive radio system requesting the spectrum resource cannot acquire the remaining spectrum resource, it is further judged whether there is a remaining spectrum resource in the wireless communication system. If the second judging module 1032 determines that there is no remaining spectrum resource in the wireless communication system, it is indicated that all spectrum resources in the wireless communication system have been utilized sufficiently, that is, no spectrum resource can be allocated to the cognitive radio system requesting the spectrum resource by adjusting current spectrum usage of the cognitive radio systems. In this case, the trigger determining module 1032 determines not to trigger transition to the spectrum usage of the cognitive radio systems, and determines to refuse accessing of the cognitive radio system requesting the spectrum resource. If there is the remaining spectrum resource in the wireless communication system, the trigger determining module 1032 can determine to trigger spectrum transition to the spectrum usage of the cognitive radio systems, and thus the spectrum resource is provided for the cognitive radio system requesting the spectrum resource through spectrum transition while ensuring the interference to the primary system to be within the interference threshold range of the primary system.

In a case that the trigger determining module 1032 determines not to trigger spectrum transition to spectrum usage of the cognitive radio systems, the spectrum management device 1 may determine to refuse accessing of the cognitive radio system.

The trigger operation that the transition triggering unit 103 according to the present disclosure determines whether to trigger transition to the cognitive radio system may be referred to as coexistence discovery.

In response to that the transition triggering unit 103 determines to trigger spectrum transition to the cognitive radio systems managed by the spectrum management device, the acquiring unit 101 in the processing circuit 10 can acquire spectrum transition capability information of the cognitive radio systems managed by the spectrum management device, and a cognitive radio system supporting spectrum transition can be selected based on the acquired spectrum transition capability information. Further, the transition determining unit 102 in the processing circuit 10 determines spectrum transition to the cognitive radio system(s) supporting the spectrum transition operation.

According to the above description, the acquiring unit 101 in the processing circuit 10 acquires spectrum usage information of the cognitive radio systems in response to the spectrum resource request and acquires the spectrum transition capability information in response to the determination of triggering spectrum transition to the cognitive radio system, but the present application is not limited thereto. For example, the acquiring unit 101 may acquire spectrum usage information and spectrum transition capability information of the cognitive radio systems managed by the spectrum management device at each predetermined timing.

Figure 5:
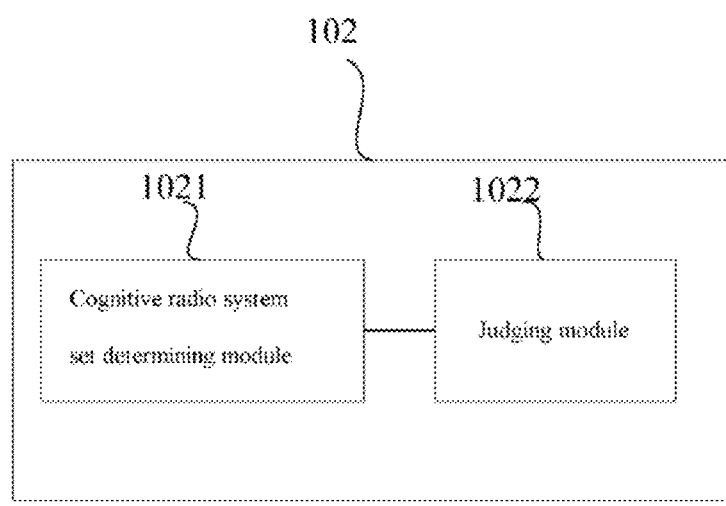
FIG. 5 is a block diagram showing an exemplary structure of a transition determining unit in FIG. 3.

An exemplary structure of the transition determining unit 102 is described in detail below. As shown in FIG. 5, the transition determining unit 102 includes a cognitive radio system set determining module 1021 and a judging module 1022. The cognitive radio system set determining module 1021 is configured to: for the remaining spectrum resource, select a cognitive radio system from the cognitive radio systems managed by the spectrum management device to form a cognitive radio system set corresponding to the remaining spectrum resource, wherein the cognitive radio system in the cognitive radio system set does not use the remaining spectrum resource, and the interference of the cognitive radio system to the primary system falls within a permissible range of the primary system when the remaining spectrum resource is allocated for use by the cognitive radio system. The judging module 1022 is configured to: judge whether there is the cognitive radio system requesting the spectrum resource in the cognitive radio system set; in a case of a positive judgement, determine the spectrum transition to the cognitive radio systems managed by the spectrum management device based on the judgment, or in a case of a negative judgment, set the spectrum resource currently used by each cognitive radio system in the cognitive radio system set to be the remaining spectrum resource. For the spectrum resource currently used by each cognitive radio system in the cognitive radio system set, the above operations by the cognitive radio determining module 1021 and the determining module 1022 are repeated, until there is the cognitive radio system requesting the spectrum resource in the cognitive radio system set.

According to the present disclosure, the cognitive radio system set determining module 1021 determines a cognitive radio system included in the cognitive radio system set corresponding to the remaining spectrum resource based on the following condition: the cognitive radio system does not use the remaining spectrum resource, and the interference of the cognitive radio system to the primary system falls within a permissible range of the primary system when the remaining spectrum resource is allocated for use by the cognitive radio system. That is, if the remaining spectrum resource is adjusted to be allocated for use by the cognitive radio system, after the transition the interference caused to the primary system when all cognitive radio systems including said cognitive radio system in the whole communication system use the spectrum resources (i.e. when said cognitive radio system uses the remaining spectrum resource (according to the present disclosure, if the remaining spectrum resource is released by a certain cognitive radio system, that cognitive radio system needs to stop using the remaining spectrum resource) and other cognitive radio systems use their currently used spectrum resources) falls within an interference threshold range of the primary system.

Figure 6:
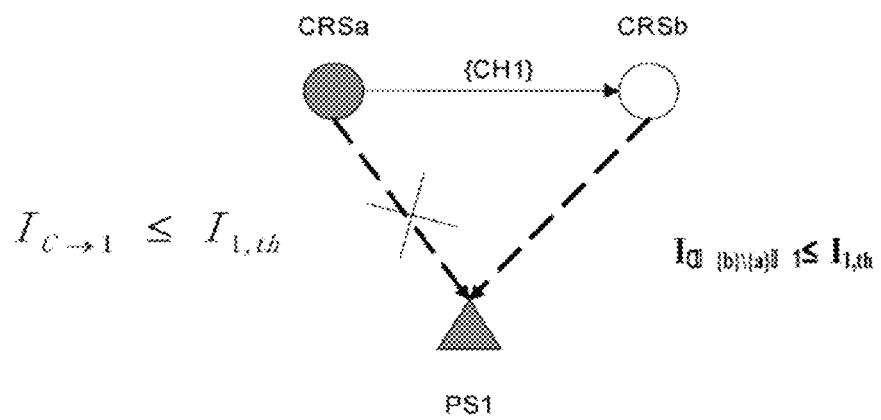
FIG. 6 is a schematic diagram showing an example of spectrum transition of a cognitive radio system according to the present disclosure.

FIG. 6 shows an example of determining spectrum transition (spectrum transition) between two cognitive radio systems in a case that the remaining spectrum resource is a newly released spectrum resource.

As shown in FIG. 6, the communication system includes two cognitive radio systems CRSa and CRSb. The CRSa uses a spectrum $CH_1$, and the CRSb does not use the spectrum $CH_1$. $PS_1$ indicates any primary system (or a primary system reference point, which is an equivalent position for calculating interference to the primary system) using the $CH_1$. In a case that after the spectrum $CH_1$ is transferred from CRSa to CRSb (that is, the CRSb uses the spectrum $CH_1$ released by the CRSa), aggregation interference of the CRSb to $PS_1$ is still in a permissible range of $PS_1$, it is considered that the spectrum $CH_1$ can be transferred from CRSa to CRSb. As shown in FIG. 6, $I_{C \rightarrow 1}$ indicates aggregation interference to $PS_1$ caused by all the cognitive radio systems that are currently using $CH_1$, where C indicates a set of cognitive radio systems for which a current list of available spectrums includes $CH_1$. $I_{1,th}$ indicates an interference threshold of the primary system $PS_1$. If the spectrum $CH_1$ is transferred from CRSa to CRSb, new aggregation interference suffered by $PS_1$ is calculated as $I_{C \cup \{b\} \backslash \{a\} \rightarrow 1}$. Here, the operation of the set, i.e. $C \cup \{b\} \backslash \{a\}$, indicates forming a new cognitive radio system set by adding CRSb to and removing CRSa from a set C. If $I_{C \cup \{b\} \backslash \{a\} \rightarrow 1} \leq I_{1,th}$, the spectrum $CH_1$ can be transferred from CRSa to CRSb. In this case, when CRSa releases the spectrum resource $CH_1$ that it uses, CRSb may be included in the cognitive radio system set corresponding to the remaining spectrum resource $CH_1$ that is released.

Still referring to FIG. 6 and considering a case where the cognitive radio system CRSa releases the spectrum resource $CH_1$ that it uses as an example, a specific process is described for determining the cognitive radio system set corresponding to the remaining spectrum resource $CH_1$. However, it should be understood by those skilled in the art that, in the following description of determining the cognitive radio system set, the spectrum resource $CH_1$ may alternatively be a spectrum resource unused or a newly released spectrum resource in the wireless communication system unless otherwise specified.

In a case that the cognitive radio system CRSb is not currently using the spectrum resource $CH_1$, for example, the determination regarding whether the interference to the primary system falls within an interference threshold range of the primary system when the cognitive radio system CRSb uses the remaining spectrum resource $CH_1$ may involve the following two cases.

In a first case, the remaining spectrum resource $CH_1$ is not a usage spectrum of the cognitive radio system CSRb but is available to the cognitive radio system CSRb, which indicates that the GLDB considers the interference of CRSb to $PS_1$ when allocating the available spectrum to CRSb. Therefore, CRSb belongs to the set C, and $C \cup \{b\} \backslash \{a\} = C \backslash \{a\}$. That is, $C \cup \{b\} \backslash \{a\}$ is a proper subset of C, and $I_{C \cup \{b\} \backslash \{a\} \rightarrow 1} \leq I_{1,th}$ is met certainly. Hence, in this case, it can be determined, directly based on the available spectrum information of the cognitive radio systems managed by the spectrum management device, to include CRSb in the cognitive radio system set corresponding to the idle spectrum resource $CH_1$ that is released.

In a second case, $CH_1$ does not belong to the list of available spectrums for CRSb, and the relationship between $I_{C \cup \{b\} \backslash \{a\} \rightarrow 1}$ and $I_{1,th}$ cannot be determined and recalculation is needed.

For the second case, one possible implementation is as follows. The spectrum management device 1 may access all the information stored and calculated by the geo-location database. Specifically, the geo-location database recalculates, for each cognitive radio system managed by the spectrum management device 1, interference to the primary system (or the primary system reference point) when the remaining spectrum resource is allocated for use by the cognitive radio system and determines whether the interference falls within the interference threshold of the primary system. If the interference falls within the interference threshold of the primary system, the cognitive radio system set determining module 1021 includes the cognitive radio system in the cognitive radio system set corresponding to the remaining spectrum resource; otherwise, the cognitive radio system set determining module 1021 does not include the cognitive radio system in the cognitive radio system set corresponding to the remaining spectrum resource. Then, based on the cognitive radio system set determined by the cognitive radio system set determining module 1021, the judging module 1022 performs judging so as to determine a spectrum transition solution based on the judging.

In order to further reduce a calculation amount in determining the cognitive radio system set, in a case that the remaining spectrum resource is a spectrum resource newly released by a cognitive radio system, the cognitive radio system set determining module 1021 may be configured to select cognitive radio systems for forming the cognitive radio system set, based on information on a movable range of each cognitive radio system relative to the primary system when the interference of the cognitive radio system to the primary system falls within the permissible range of the primary system while the current spectrum resource usage of the cognitive radio system is maintained. According to the present disclosure, a movable range refers to the following range: when each cognitive radio system in the wireless communication system moves in that range while keeping using the currently used spectrum, it does not cause harmful interference to the primary system, that is, the interference of the cognitive radio system to the primary system falls within the permissible range of the primary system. According to the present disclosure, in a case that the wireless communication system includes multiple primary systems, the cognitive radio system has one movable range for each of the multiple primary systems.

Generally, the available spectrum information of the cognitive radio system sent from the geo-location database to any cognitive radio system CRS or the spectrum management device further includes information on a movable range of the cognitive radio system (that is, the aggregation interference to the target primary system (or the primary system reference point) is not increased when the cognitive radio system moves in the movable range while keeping the current spectrum resource usage). According to the present disclosure, the cognitive radio system for forming the cognitive radio system set corresponding to the remaining spectrum resource that is released may be selected based on information on the movable range, and it is determined whether the interference to the primary system falls within the interference threshold range of the primary system when the remaining spectrum resource is allocated for use by the selected cognitive radio system, so as to narrow a range of trials and reduce the calculation amount.

According to the present disclosure, when considering an transition target for the spectrum resource $CH_1$ used by the cognitive radio system CRSa (that is, $CH_1$ is regarded as the remaining spectrum resource according to the present disclosure) (the transition target being a cognitive radio system which may use the spectrum resource $CH_1$ in the spectrum transition, namely, the cognitive radio system in the cognitive radio system set corresponding to the remaining spectrum resource as described in the present disclosure), only other cognitive radio system that is located in the movable range of the cognitive radio system CRSa releasing the spectrum resource $CH_1$ and is not using the spectrum resource need to be considered as a potential transition target.

According to the present disclosure, the cognitive radio system set determining module 1021 is configured to select, among the cognitive radio systems managed by the spectrum management device, cognitive radio systems that are located in the movable range of the cognitive radio system releasing the remaining spectrum resource, to form the cognitive radio system set corresponding to the remaining spectrum resource.

In a case that the wireless communication system includes one primary system, the cognitive radio system set determining module 1021 may select, among the cognitive radio systems managed by the spectrum management device, cognitive radio systems that are located in the movable range of the cognitive radio system releasing the remaining spectrum resource, to form the cognitive radio system set corresponding to the remaining spectrum resource.

In a case that the wireless communication system includes more than one primary system, the cognitive radio system set determining module 1021 may select cognitive radio systems that are located in an overlapped area of a plurality of movable ranges of the cognitive radio system releasing the remaining spectrum resource, to form the cognitive radio system set corresponding to the remaining spectrum resource.

Preferably, as a cognitive radio system is farther from the primary system, it generates less interference to the primary system. That is, there is a great probability for a case where compared with the cognitive radio system releasing the remaining spectrum resource, a cognitive radio system further away from the primary system generates less interference to the primary system when using the remaining spectrum resource. Based on this, the cognitive radio system in the movable range that is further away from the primary system than the cognitive radio system releasing the spectrum resource can be selected to form the cognitive radio system set corresponding to the remaining spectrum resource.

Hereinafter, in conjunction with FIG. 7(a) and FIG. 7(b), a specific process of determining the cognitive radio system for forming the cognitive radio system set corresponding to the remaining spectrum resource by the cognitive radio system set determining module 1021 based on the movable range of the cognitive radio system is described in detail.

FIG. 7(a) shows a case that only one primary system (or primary system reference point), i.e., $PS_1$, shares the same spectrum resource $CH_1$ with the cognitive radio system CRSa. In this case, in order to determine the cognitive radio system set corresponding to $CH_1$, when the cognitive radio system CRSa releases the spectrum resource $CH_1$ as the remaining spectrum resource, the cognitive radio system that is located in the movable range of cognitive radio system CRSa and further away from $PS_1$ than CRSa may be selected with a priority to form the cognitive radio system set corresponding to the remaining spectrum resource $CH_1$. As shown in FIG. 7a, for example, a cognitive radio system CRSb further away from the primary system PS1 than the cognitive radio system CRSa is selected from a circle which takes the cognitive radio system CRSa releasing the remaining spectrum resource $CH_1$ as the center and has a moving radius r meeting a standard (for example, a moving distance threshold (such as 50 m specified in FCC Report 186)), to form the cognitive radio system set corresponding to the remaining spectrum resource $CH_1$.

FIG. 7(b) shows a case that multiple primary systems (or primary system reference points), for example $PS_1$, $PS_2$ and $PS_3$, share the same spectrum resource $CH_1$ with the cognitive radio system CRSa. In this case, a movable range of the cognitive radio system CRSa relative to each of the primary systems $PS_1$, $PS_2$, and $PS_3$ (or the primary system reference points) is calculated, a circle with a maximum area in an overlapped area of the movable ranges is determined as the movable range of the cognitive radio system CRSa, and the cognitive radio system in the movable range is selected to form the cognitive radio system set corresponding to the remaining spectrum resource $CH_1$. As shown in FIG. 7(b), the cognitive radio system CRSb is not located in the movable range of CRSa, and thus the CRSb is not selected for forming the cognitive radio system set corresponding to the remaining spectrum resource $CH_1$.

In order to ensure that the interference of the cognitive radio system in thus determined cognitive radio system set to the primary system when the cognitive radio system uses the remaining spectrum resource falls within the interference range of the primary system, the cognitive radio system set determining module 1021 according to the present disclosure is further configured to calculate interference of each cognitive radio system in the determined cognitive radio system set to the primary system when it uses the remaining spectrum resource, determine whether the interference of the cognitive radio system to the primary system when the remaining spectrum resource is allocated for use by the cognitive radio system falls within the permissible range of the primary system based on the calculation, and remove the cognitive radio system of which the interference to the primary system is beyond the permissible range of the primary system from the cognitive radio system set. For example, the spectrum management device 1 may send information on the cognitive radio system set determined by the cognitive radio system set determining module 1021 to a geo-location database. The geo-location database calculates interference of each cognitive radio system in the determined cognitive radio system set to the primary system when it uses the remaining spectrum resource, and feeds back a calculation result to the spectrum management device 1, so that the cognitive radio system set determining module 1021 removes the cognitive radio system of which interference to the primary system is beyond the permissible range of the primary system from the cognitive radio system set based on the calculation result.

With the above verification operation, it can be ensured that the interference to the primary system does not go beyond the permissible range of the primary system, in a case that the remaining spectrum resource corresponding to the cognitive radio system set is allocated for use by the cognitive radio system in the cognitive radio system set.

The process of determining the cognitive radio system set based on information on the movable range of each cognitive radio system relative to the primary system is described above. As discussed, compared with the solution of calculating interference for each cognitive radio system managed by the spectrum management device 1, with the solution of determining the cognitive radio system set based on the movable range of the cognitive radio system, a calculation range can be narrowed significantly and the calculation amount can be reduced.

In addition, for each cognitive radio system, since the allocated resources are obtained at different time (depending on the time when the spectrum resources are requested) while resource allocation to other nodes in the network may differ the allocated resources to that cognitive radio system may accordingly differ.

According to another embodiment of the present disclosure, in a case that the remaining spectrum resource is a spectrum resource newly released by the cognitive radio system, the cognitive radio system set determining module 1021 may be further configured to select the cognitive radio system for forming the cognitive radio system set based on information on the time when usage spectrums are allocated to the cognitive radio systems.

The usage spectrum information sent from the geo-location database to the cognitive radio system and the spectrum management device may include a time stamp when the cognitive radio system is allocated its currently used spectrum resource. The time stamp indicates a time $T_{latest}$ when the cognitive radio obtains the currently used spectrum resource. The cognitive radio system set determining module 1021 may select the cognitive radio system for forming the cognitive radio system set corresponding to the remaining spectrum resource, based on the time $T_{latest}$ when the cognitive radio system obtains the currently used spectrum resource Hereinafter, in conjunction with FIG. 8, a process of selecting cognitive radio systems for forming the cognitive radio system set corresponding to the remaining spectrum resource by the cognitive radio system set determining module 1021 based on information on a time when the usage spectrums of each cognitive radio system is allocated is described in detail.

FIG. 8 illustrate s an example in which, for three cognitive radio systems CRSb, CRSa and CRSc, time stamps when their currently used spectrums are allocated are arranged in sequence on a time axis, wherein a time when the usage spectrum $CH_1$ of the cognitive radio system CRSa is allocated to CRSa is later than a time when the usage spectrum $CH_2$ of the cognitive radio system CRSb is allocated to CRSb but earlier than a time when the usage spectrum $CH_3$ of the cognitive radio system CRSc is allocated to CRSc. In a case that the cognitive radio system CRSa releases its usage spectrum $CH_1$ and $CH_1$ is not an available spectrum for CRSb and CRSc, the time when the cognitive radio system CRSb is allocated its currently used spectrum is earlier than the time when the usage spectrum $CH_1$ of the cognitive radio system CRSa is allocated, which indicates the following: the spectrum resource $CH_1$ is considered when CRSb is allocated its currently used spectrum, but it is determined by calculation that the interference of CRSb to the primary system when it uses $CH_1$ does not meet the condition, thereby $CH_1$ is determined not to be used by CRSb. The time when the cognitive radio system CRSc is allocated its currently used spectrum is later than the time when the usage spectrum $CH_1$ of the cognitive radio system CRSa is allocated, and a reason why the spectrum resource $CH_1$ is not allocated to the cognitive radio system CRSc may be that the cognitive radio system CRSa is using the spectrum resource $CH_1$. Therefore, the cognitive radio system CRSc can use the spectrum resource $CH_1$ released by the cognitive radio system CRSa with a greater probability than the cognitive radio system CRSb. That is, the interference of the cognitive radio system CRSc to the primary system when it uses the spectrum resource $CH_1$ is more likely to fall within an interference threshold range of the primary system than the cognitive radio system CRSb.

Therefore, according to the present disclosure, the cognitive radio system set determining module 1021 is configured to select, from cognitive radio systems managed by the spectrum management device, a cognitive radio system to which the usage spectrum is allocated at a time later than a time when the remaining spectrum resource is allocated to the cognitive radio system that releases the remaining spectrum resource, to form the cognitive radio system set corresponding to the remaining spectrum resource.

In order to ensure that the interference of the cognitive radio system in thus determined cognitive radio system set to the primary system when it uses the remaining spectrum resource falls within the interference range of the primary system, according to the present disclosure, similar to the process of selecting the cognitive radio systems for forming the cognitive radio system set based on information on the movable range of each cognitive radio system relative to the primary system, the cognitive radio system set determining module 1021 calculates interference of each cognitive radio system in the determined cognitive radio system set to the primary system when it uses the remaining spectrum resource, determines whether the interference to the primary system falls within the permissible range of the primary system when the remaining spectrum resource is allocated to the cognitive radio system based on the calculation, and removes the cognitive radio system of which the interference to the primary system goes beyond the permissible range of the primary system from the co hive radio system set. Similar to the process of selecting the cognitive radio system based on the information on the movable range, the spectrum management device 1 may send information on the cognitive radio system set determined by the cognitive radio system set determining module 1021 to the geo-location database. The geo-location database calculates the interference of each cognitive radio system in the determined cognitive radio system set to the primary system when it uses the remaining spectrum resource, and feeds back a calculation result to the spectrum management device 1, so that the cognitive radio system set determining module 1021 removes the cognitive radio system of which the interference to the primary system goes beyond the permissible range of the primary range from the cognitive radio system set based on a calculation result.

Although the manner of determining the cognitive radio system set based on the information on the movable range of each cognitive radio system relative to the primary system and the manner of determining the cognitive radio system set based on information on a time when a usage spectrum of each cognitive radio system is allocated are described above, it should be understood that the two manners may be combined for use. Specifically, the cognitive radio system sets may be respectively determined by using the above two manners, and the determined cognitive radio system sets are combined to form a final cognitive radio system set, and the judging module 1022 performs judging based on the final cognitive radio system set.

After obtaining the cognitive radio system set corresponding to the remaining spectrum resource, the judging module 1022 may determine spectrum a transition to the cognitive radio systems based on determination regarding whether the cognitive radio system set includes the cognitive radio system requesting a spectrum resource. If the cognitive radio system set does not include the cognitive radio system requesting the spectrum resource, the spectrum resource currently used by each cognitive radio system included in the cognitive radio system set is taken as the remaining spectrum resource. The operations of the cognitive radio system set determining module 1021 and the judging module 1022 are repeated, until the newly determined cognitive radio system set includes the cognitive radio system requesting the spectrum resource, thereby determining spectrum transition of the cognitive radio systems. That is, according to the present disclosure, taking the remaining spectrum source as a starting point, firstly the cognitive radio system set corresponding to the remaining spectrum resource is determined, then by taking the spectrum resource used by each cognitive radio system in the cognitive radio system set as the remaining spectrum resource, the cognitive radio system set corresponding to each remaining spectrum resource is determined, and the above operations are sequentially repeated until the cognitive radio system set includes the cognitive radio system requesting the spectrum resource. That is, the cognitive radio system requesting the spectrum resource is taken as the end point of the operations of the cognitive radio system set determining module 1021.

During the process of sequentially determining the cognitive radio systems, if the cognitive radio system requesting the spectrum resource is not found after the operation of determining the cognitive radio systems is repeated for a predetermined number of times, it is not likely to find a spectrum transition solution for the cognitive radio system requesting the spectrum resource. Based on this, in order to control the design scale and the complexity of the spectrum transition solution, according to a preferred embodiment of the present disclosure, the processing circuit is configured to determine not to allocate a spectrum resource to the cognitive radio system requesting the spectrum resource, in a case that the cognitive radio system set still does not include the cognitive radio system requesting the spectrum resource after the cognitive radio system set determining module 1021 and the judging module 1022 repeat their operations for a predetermined threshold of times.

Hereinafter, another exemplary structure of a transition determining unit is described in detail in conjunction with FIG. 9.

Figure 9:
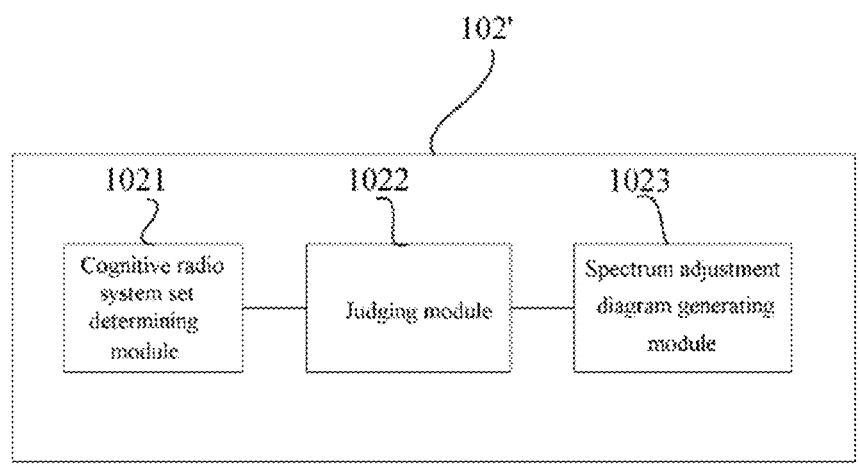
FIG. 9 schematically shows another exemplary structure of a transition determining unit.

As shown in FIG. 9, similar to the transition determining unit 102, an transition determining unit 102' also includes the cognitive radio system set determining module 1021 and the judging module 1022, and it further includes a spectrum transition diagram generating module 1023 configured to create a diagraph based on the cognitive radio system set as a spectrum transition graph, and determine spectrum transition information on the spectrum transition based on the spectrum transition graph by using a depth-first search process or a breadth-first search process. The diagraph is created by: setting the cognitive radio system which releases the remaining spectrum resource or the spectrum management device as a tail node; setting each of the cognitive radio systems in the cognitive radio system set corresponding to the remaining spectrum resource as a head node; and setting the remaining spectrum resource as a weight of a directed side connecting the tail node and the head node. According to the present disclosure, in a case that the remaining spectrum resource is a spectrum resource unused in the system or other spectrum resource for which an upper limit of the user usage is not reached, the spectrum management device may function as a source node when the diagraph is created.

Figure 10:
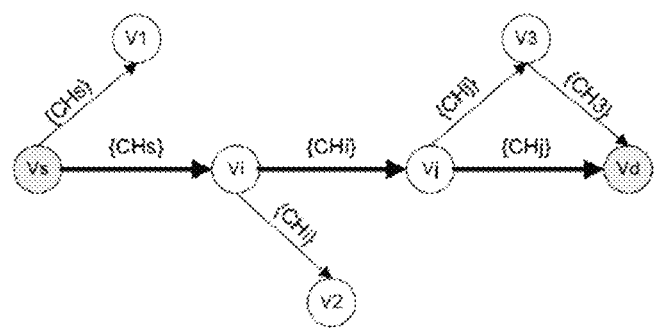
FIG. 10 schematically shows an example of a spectrum transition diagram according to an embodiment of the present disclosure.

FIG. 10 shows an example of a directed path of the spectrum transition graph. In FIG. 10, $V_s$ indicates a node with a remaining spectrum resource (which may be a cognitive radio system releasing the remaining spectrum resource; if the remaining spectrum resource is a spectrum resource unused or other spectrum resource for which the upper limit of the user usage is not reached in the wireless communication system, the node may be represented by a logic node indicating the spectrum management device); $V_t$ or $V_j$ indicates a cognitive radio system in a cognitive radio system set corresponding to the remaining spectrum resource, $V_j$ indicates a cognitive radio system in the cognitive radio system set corresponding to the remaining spectrum resource indicated by $V_i$, and $V_d$ indicates a cognitive radio system requesting a spectrum resource. A directed edge taking $V_i$ as a tail node and V; as a head node is taken as an example. The directed edge indicates that a spectrum resource currently used by the cognitive radio system indicated by the tail node may be transferred to the cognitive radio system indicated by the head node (in this case, the cognitive radio system indicated by the tail node releases its currently used spectrum resource), that is, the interference to the primary system due to the above spectrum transition falls within the permissible range of the primary system. The determined spectrum transition solution is indicated by a directed path from $V_s$ to $V_d$ on the spectrum transition graph G. The hop count of the directed path indicates the number of times of spectrum transition, that is, the number of the cognitive radio systems to be reconfigured. Therefore, a preferable spectrum transition solution is a shortest directed path from $V_s$ to $V_d$. The shortest directed path may be obtained by a breadth-first search (BFS) process or a depth-first search (DFS) process, for example.

Based on the spectrum transition diagram generated by the spectrum transition diagram generating module 1023, the transition determining unit 102' can determine the optimal spectrum transition solution, and sends spectrum transition information on the optimal spectrum transition solution to the corresponding cognitive radio systems, so that the cognitive radio systems adjust their spectrum usage based on the spectrum transition information. After determining the spectrum transition solution and thus determining the spectrum transition information, the spectrum management device can generate a reconfiguration request based on the spectrum transition information, and send the spectrum transition information to the corresponding cognitive radio systems together with the reconfiguration request. The spectrum transition information includes: an identifier of a cognitive radio system to perform a spectrum transition operation, information on spectrum resources newly allocated to the cognitive radio system and/or information on spectrum resources to be released by the cognitive radio system, for example.

After receiving the reconfiguration request, the respective cognitive radio reconfigures the spectrum resource that it uses based on the spectrum transition information in response to the reconfiguration request.

Figure 11:
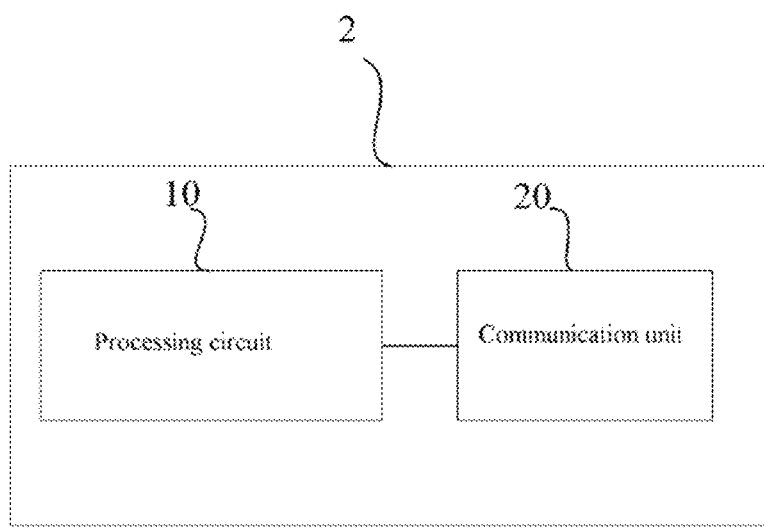
FIG. 11 is a block diagram showing another example of a spectrum management device according to an embodiment of the present disclosure.

FIG. 11 is a block diagram showing another example of the spectrum management device according to an embodiment of the present disclosure. As shown in FIG. 101, in addition to the processing circuit 10 described above, the spectrum management device 2 further includes a communication unit 20 configured to send spectrum transition information on spectrum transition determined by the processing circuit 10. The spectrum transition information includes: an identifier of a cognitive radio system to perform a spectrum transition operation, information on spectrum resources newly allocated to the cognitive radio system and/or information on spectrum resources to be released by the cognitive radio system. According to the present disclosure, the communication unit 20 sends spectrum transition information to cognitive radio systems involved in spectrum transition, so that the cognitive radio systems adjust their spectrum usage based on the spectrum transition information, and update respective lists of available spectrums and lists of usage spectrums. The communication unit 20 is further configured to report the spectrum transition information to the geo-location database in addition to the respective cognitive radio systems, so that the geo-location database updates the lists of available spectrums and/or lists of usage spectrums of the cognitive radio systems that it maintains.

According to the embodiment of the present disclosure, the communication unit 20 is further configured to receive at least one of spectrum usage information and spectrum transition capability information of the cognitive radio system managed by the spectrum management device, information on the remaining spectrum resource, information on a movable range of the cognitive radio system, and information on a time when the usage spectrum of the cognitive radio system is allocated. According to the present disclosure, the communication unit 20 may receive at least one of the above information from the geo-location database. Alternatively, the communication unit 20 may receive at least one of the above information from the corresponding cognitive radio system.

Figure 12:
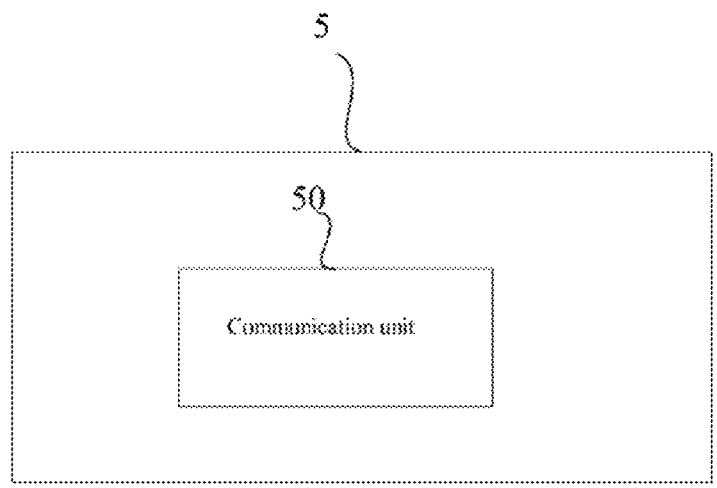
FIG. 12 is a block diagram showing an example of a cognitive radio system device for a wireless communication system according to an embodiment of the present disclosure.

According to an embodiment of the present disclosure, a cognitive radio system device for a wireless communication system is further provided. FIG. 12 shows a block diagram of an example of a cognitive radio system device for the wireless communication system according to an embodiment of the present disclosure. As shown in FIG. 12, the cognitive radio system device 5 includes a communication unit 50 configured to send spectrum usage information and spectrum transition capability information of the cognitive radio system, so as to determine spectrum transition to the cognitive radio system based on the spectrum usage information and the spectrum transition capability information, and receive spectrum transition information for adjusting spectrum usage of the cognitive radio system.

According to the present disclosure, the spectrum transition information includes: an identifier of a cognitive radio system to perform a spectrum transition operation, information on spectrum resources newly allocated to the cognitive radio system and/or information on spectrum resources to be released by the cognitive radio system. The cognitive radio system adjusts its spectrum usage based on the spectrum transition information.

For example, the cognitive radio system may receive the spectrum management information from the spectrum management device described with reference to FIG. 1 to FIG. 11, and adjust spectrum usage of the secondary users in the cognitive radio system where the cognitive radio system device is located based on the spectrum transition information.

The cognitive radio system may be a secondary base station or a secondary user. The cognitive radio system according to the embodiment of the present disclosure may be secondary base stations included in the cognitive radio systems a, b and c shown in FIG. 1, for example.

According to the embodiment of the present disclosure, the communication unit 50 is further configured to send a spectrum request for requesting usage of a spectrum resource, to trigger the spectrum management device managing the cognitive radio system to determine whether to perform spectrum transition based on the request. For example, in the above embodiment, the transition triggering unit 103 in the processing circuit 10 of the spectrum management device 1 determines whether to trigger spectrum resource transition to the cognitive radio system managed by the spectrum management device based on the spectrum resource request sent by the cognitive radio system.

According to an embodiment of the present disclosure, a geo-location database for a wireless communication system is further provided. The wireless communication system includes a primary system and a cognitive radio system.

Figure 13:
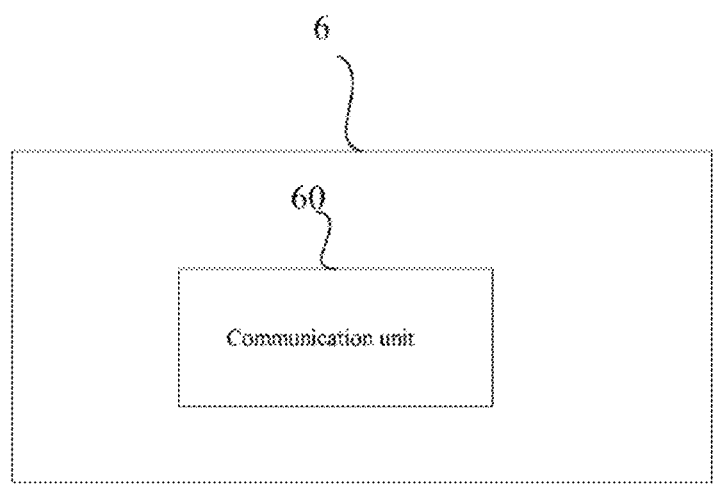
FIG. 13 is a block diagram showing an example of a geographic location database for a wireless communication system according to an embodiment of present disclosure.

FIG. 13 shows an exemplary structure of a geo-location database. As shown in FIG. 13, the geo-location database 6 includes a communication unit 60 configured to: provide spectrum usage information and spectrum transition capability information of the cognitive radio systems. The spectrum usage information corresponds to information on usage spectrum allocated for use by each cognitive radio system, and the spectrum transition capability information corresponds to information on whether the cognitive radio system supports a spectrum transition operation. The spectrum usage information and the spectrum transition capability information are used to determine spectrum transition to the cognitive radio system in the wireless communication system.

The communication unit 60 of the geo-location database 6 is configured to provide the spectrum usage information and the spectrum transition capability information of the cognitive radio system to the spectrum management device based on the spectrum resource request of the cognitive radio system, so that the spectrum management device determines spectrum resource transition to the cognitive radio systems managed by the spectrum management device based on the usage spectrum information and the spectrum transition capability information. According to an embodiment of the present disclosure, the geo-location database provides the usage spectrum information and the spectrum transition capability information of the maintained cognitive radio systems to the spectrum management device, for example; provides available spectrum information of each cognitive radio system based on geographic location information of the cognitive radio system; and provides the information stored in the geo-location database to the spectrum management device based on the spectrum resource request of the cognitive radio system.

Figure 14:
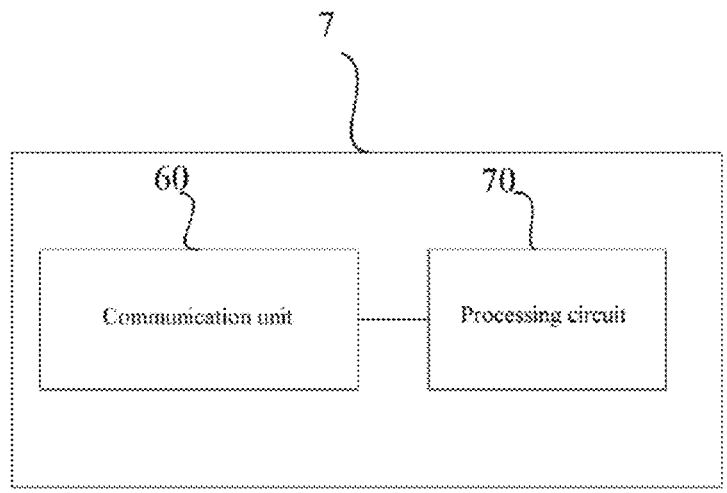
FIG. 14 is a block diagram showing another example of a geographic location database for a wireless communication system according to an embodiment of the present disclosure.

FIG. 14 shows another exemplary structure of the geo-location database. As shown in FIG. 14, similar to the geo-location database 6 shown in FIG. 13, a geo-location database 7 also includes the communication unit 60, and it further includes a processing circuit 70 configured to determine whether to trigger spectrum transition to the cognitive radio systems based on whether there is a remaining spectrum resource in the wireless communication system and whether the remaining spectrum resource can be allocated to a cognitive radio system requesting a spectrum resource. That is, according to the present disclosure, a process of determining whether to trigger a spectrum transition operation can be performed by the spectrum management device, and can also be performed by the geo-location database in response to the spectrum resource request of the cognitive radio system. The specific manner for the determining is similar to that performed by the transition triggering unit 103 in the processing circuit 10 described in the above embodiment, which is not repeated here. That is, the coexistence discovery operation according to the present disclosure may be performed by the geo-location database.

According to the present disclosure, the processing circuit 70 in the geo-location database 7 is further configured to select, for the remaining spectrum resource, a cognitive radio system for forming a cognitive radio system set, wherein the cognitive radio system is not using the remaining spectrum resource but the interference of the cognitive radio system to the primary system will fall within a permissible range of the primary system if the remaining spectrum resource is allocated for use by the cognitive radio system. This selection can be performed by calculating the interference of a cognitive radio system to the primary system when it uses the remaining spectrum resource and accordingly removing a cognitive radio system of which interference to the primary system goes beyond the permissible range of the primary system from the cognitive radio system set.

According to the present disclosure, the geo-location database 7 may calculate, in response to a cognitive radio system set sent to it by the spectrum management device, interference of each cognitive radio system in the cognitive radio system set to the primary system, and sends a calculation result to the spectrum management device via the communication unit 60, so that the spectrum management device removes the cognitive radio system of which interference to the primary system goes beyond the permissible range of the primary system from the determined cognitive radio system set, thereby ensuring accuracy of determining the spectrum transition solution based on the cognitive radio system set. In addition, for the cognitive radio system set determined by the spectrum management device based on a movable range of each cognitive radio system and/or information on a time when each cognitive radio system is allocated its currently used spectrum resource, the geo-location database 7 may also calculate interference of each cognitive radio system in the cognitive radio system set to the primary system when the cognitive radio system uses the remaining spectrum resource. In addition, the geo-location database 7 may also calculate, for each of all the cognitive radio systems managed by the spectrum management device, interference of the cognitive radio system to the primary system when the cognitive radio system uses the remaining spectrum resource. In this case, it may be deemed that the cognitive radio system set is formed by all the cognitive radio systems managed by the spectrum management device.

In addition, the communication unit 60 of the geo-location databases 6 and 7 according to the present disclosure is further configured to receive the determined spectrum transition information from the spectrum management device, so that the geo-location database updates lists of available spectrums and/or lists of usage spectrums of the cognitive radio systems that it maintains.

According to the present disclosure, the coexistence discovery operation may be performed by an independent entity. For example, the coexistence discovery operation may be performed by a coexistence discovery device (for example, the coexistence discovery device defined in the standard IEEE P802.1.9a).

Figure 15:
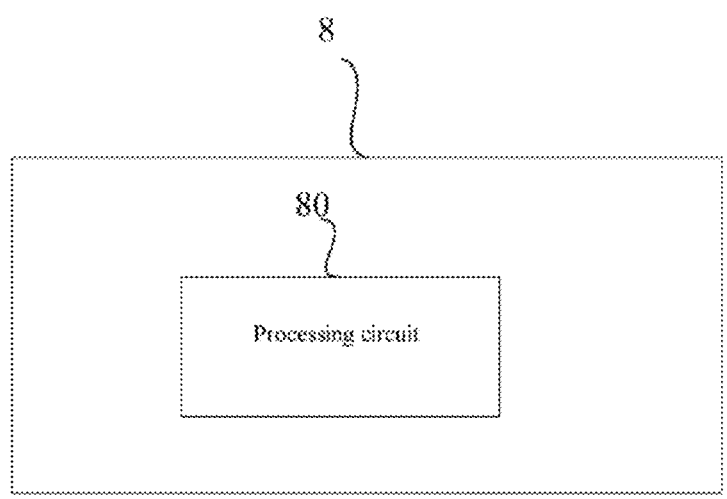
FIG. 15 is a block diagram showing an exemplary structure of a coexistence discovery device according to an embodiment of the present disclosure.

According to the present disclosure, a coexistence discovery device for a wireless communication system including a primary system and a cognitive radio system is further provided. FIG. 15 shows an exemplary structure of the coexistence discovery device.

As shown in FIG. 15, the coexistence discovery device 8 includes a processing circuit 80 configured to: in a case that there is a cognitive radio system making a request for a spectrum resource and there is a remaining spectrum resource in the wireless communication system that is unavailable to the cognitive radio system making the request for the spectrum resource without any change to spectrum resource allocation of other cognitive radio systems, determine whether to trigger the spectrum transition to the cognitive radio system in the wireless communication system in response to the request, so that the spectrum management device managing the cognitive radio system acquires the spectrum transition capability information of the cognitive radio system managed by the spectrum management device in a case of determining to trigger the spectrum transition to the cognitive radio system in the wireless communication system, and thus determines the spectrum transition to the managed cognitive radio system based on the spectrum transition capability information of the cognitive radio system. The spectrum transition capability information corresponds to information on whether the cognitive radio system supports a spectrum transition operation. For the process of determining whether to trigger spectrum transition to the cognitive radio system performed by the processing circuit 80, one may refer to the processing of the transition triggering unit 103 described with reference to FIGS. 3 to 4 or the processing circuit 70 of the geo-location database 7 described with reference to FIG. 14, which is not repeated here.

Figure 16:
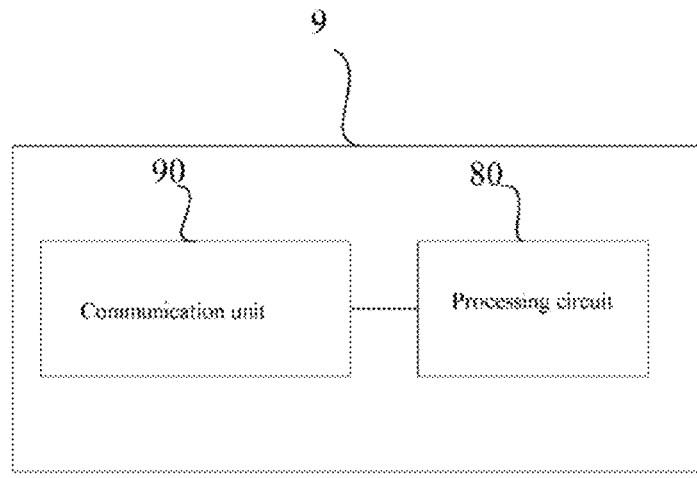
FIG. 16 shows another exemplary structure of the coexistence discovery device according to an embodiment of the present disclosure.

FIG. 16 shows another exemplary structure of the coexistence discovery device. As shown in FIG. 16, similar to the coexistence discovery device 8 in FIG. 15, a coexistence discovery device 9 also includes the processing circuit 80, and it further includes a communication unit 90 configured to receive at least one of a spectrum resource request for requesting a spectrum resource from the cognitive radio system and usage spectrum information of each cognitive radio system, and send a result determined by the processing circuit 80 on whether to trigger spectrum transition to the cognitive radio system in the wireless communication system.

Figure 17:
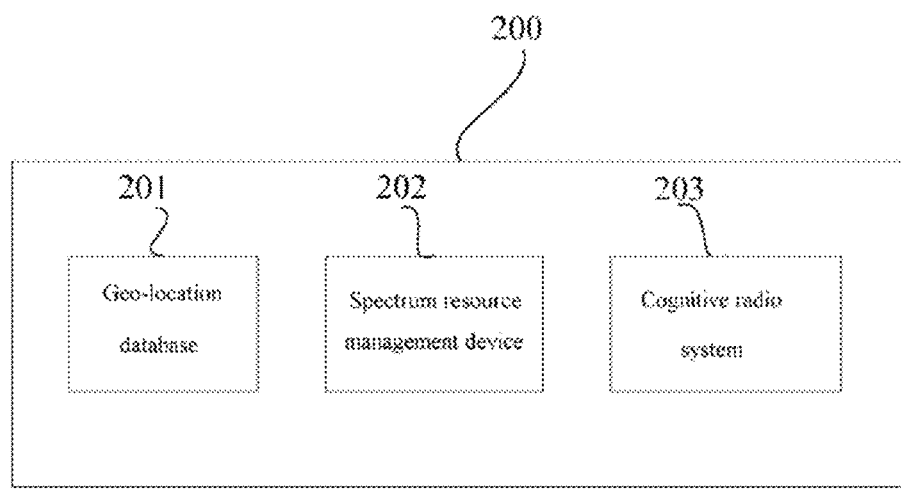
FIG. 17 shows a schematic structure of a spectrum management system according in to an embodiment of the present disclosure.

According to the present disclosure, a spectrum management system is further provided. FIG. 17 shows a block diagram of an exemplary structure of the spectrum management system according to the present disclosure. As shown in FIG. 17, the spectrum management system 200 includes a geo-location database 201, a spectrum management device 202 and a cognitive radio system 203. The geo-location database 201, the spectrum management device 202 and the cognitive radio system 203 included in the spectrum management system can, for example, respectively achieve a part or all of functions of the geo-location database 6 or 7, the spectrum management device 1 or 2, and the cognitive radio system 5 as described above. The geo-location database, the spectrum management device and the cognitive radio system are described above as entities independent from each other, but they are not limited thereto in the present disclosure. For example, the geo-location database and the spectrum management device may be two different modules of the same physical entity performing respective operations, to manage resources of the cognitive radio system. In this case, the management function of the geo-location database is effectively extended. Alternatively, in another physical implementation, the geo-location database, the spectrum management device and the cognitive radio system form one physical entity. In this case, a position of a primary system with a high priority coexisting with the cognitive radio system is fixed, and interference calculation for the primary system and spectrum transition are written into a geo-location database module and a spectrum management device module in the cognitive radio system, to reduce overhead caused by accessing the gear-location database and the spectrum management device by the cognitive radio system.

Corresponding to the spectrum management device according to the present disclosure, a spectrum management method and a method for a wireless communication system including a primary system and a cognitive radio system are provided according to the present disclosure. Hereinafter, a summary of the methods is described without repeating some details discussed above. It should be noted that, although the methods are disclosed in the process of describing the spectrum management device for the wireless communication system, the methods are not necessarily performed by or via the described components. For example, the spectrum management device, the cognitive radio system and the geo-location database for the wireless communication system may be implemented partially or completely by hardware and/or firmware. The methods discussed in the following may be completely implemented by computer executable programs, although hardware and/or firmware of the spectrum management device, the cognitive radio system and the geo-location database for the wireless communication system may be adopted during the process of implementing the methods.

Figure 18:
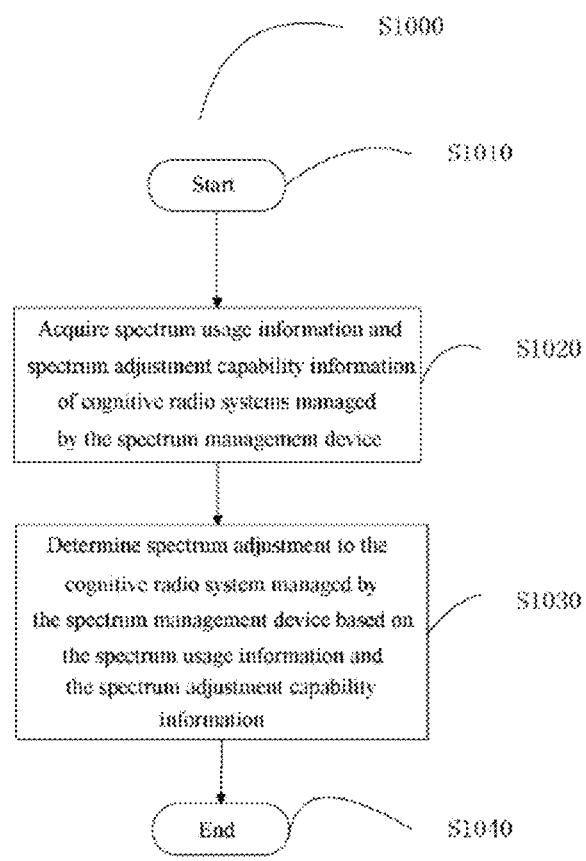
FIG. 18 is a flowchart showing a spectrum management method according to an embodiment of the present disclosure.

FIG. 18 is a flowchart showing a spectrum management method according to an embodiment of the present disclosure.

As shown in FIG. 18, the processing flow S1000 of the spectrum management method according to the embodiment of the present disclosure starts at S1010, and then performs the processing of S1020.

In step S1020, spectrum usage information and spectrum transition capability information of cognitive radio systems managed by the spectrum management device are acquired. The spectrum usage information corresponds to information on usage spectrums allocated for use by cognitive radio systems. The spectrum transition capability information corresponds to information on whether the cognitive radio system supports a spectrum transition operation. For example, one may refer to the processing of the acquiring unit 101 described with reference to FIG. 1, which is not repeated here. Then step S1030 is performed.

In step S1030, based on the spectrum usage information and the spectrum transition capability information, spectrum transition to the cognitive radio system managed by the spectrum management device is determined, so that interference caused by spectrum usage of the cognitive radio systems to the primary system falls within a permissible range of the primary system. For example, in order to implement step S1030, one may refer to the processing of the transition determining unit 102 described with reference to FIGS. 2 to 10, which is not repeated here. Then, step S1040 is performed.

The processing flow S1000 ends at step S1040.

According to the spectrum management method in the present disclosure, in a case that there is a cognitive radio system making a request for a spectrum resource, and there is a remaining spectrum resource in the wireless communication system that is unavailable to the cognitive radio system requesting the spectrum resource without any change to spectrum resource allocation of other cognitive radio systems, the spectrum usage information of the cognitive radio systems managed by the spectrum management device is acquired in response to the request.

According to the present disclosure, the remaining spectrum resource includes at least one of a spectrum resource unused and a newly released spectrum resource in the wireless communication system.

In the spectrum resource transition method according to the embodiment of the present disclosure, based on the spectrum usage information of the cognitive radio systems managed by the spectrum management device, it is determined whether to trigger spectrum transition to the cognitive radio systems, to meet spectrum resource requirement of the cognitive radio system requesting the spectrum resource.

More specifically, according to an embodiment of the present disclosure, based on whether the cognitive radio system requesting the spectrum resource can use the remaining spectrum resource and whether there is a remaining spectrum resource in the wireless communication system, it is determined whether to trigger spectrum transition to the cognitive radio systems in the wireless communication system.

In step S1020 of the spectrum resource transition method according to the embodiment of the present disclosure, in a case that it is determined to trigger spectrum transition to the cognitive radio system in the wireless communication system, spectrum transition capability information of the cognitive radio systems is acquired, and based on the spectrum transition capability information, spectrum transition to the cognitive radio system supporting the spectrum transition operation is determined.

According to the embodiment of the present disclosure, in step S1030, the following operations are performed. (i), for the remaining spectrum resource, in the cognitive radio systems managed by the spectrum management device, a cognitive radio system for forming a cognitive radio system set corresponding to the remaining spectrum resource is selected, wherein the cognitive radio system is not using the remaining spectrum resource but if the remaining spectrum resource is allocated for use by the cognitive radio system, the interference of the cognitive radio system to the primary system will fall within a permissible range of the primary system. (ii), it is judged whether there is a cognitive radio system requesting a spectrum resource in the cognitive radio system set; in a case of a positive judgement, spectrum transition to the cognitive radio systems managed by the spectrum management device is determined based on the judgment; and in a case of a negative judgment, a spectrum resource currently used by each cognitive radio system included in the cognitive radio system set is taken as the remaining spectrum resource. For the spectrum resource currently used by each cognitive radio system included in the cognitive radio system set, the operations (i) to (ii) are repeated until the cognitive radio system set includes the cognitive radio system requesting the spectrum resource. According to a preferred embodiment of the present disclosure, no spectrum resource is allocated to the cognitive radio system requesting the spectrum resource, if the operations (i) to (ii) have been repeated for a predetermined threshold of times and the respective cognitive radio system sets still do not include the cognitive radio system requesting the spectrum resource.

In the process of determining the cognitive radio system set in step S1030, with available spectrum information of the cognitive radio systems managed by the spectrum management device, cognitive radio systems for forming the cognitive radio system set can be selected. The available spectrum information is information on available spectrums of the cognitive radio system in a case that the interference of the cognitive radio system to the primary system falls within the permissible range of the primary system. Preferably, if there is a cognitive radio system for which an available spectrum includes the remaining spectrum resource among the cognitive radio systems managed by the spectrum management device, that cognitive radio system is selected to form the cognitive radio system set corresponding to the remaining spectrum resource.

In the process of determining the cognitive radio system set in step S1030, a cognitive radio system for forming the cognitive radio system set may be selected, based on information on a movable range of the cognitive radio system relative to the primary system in a case that the interference to the primary system falls within the permissible range of the primary system while the cognitive radio system maintains its current spectrum resource usage. Preferably, in a case that the remaining spectrum resource is a spectrum resource newly released in the wireless communication system, a cognitive radio system managed by the spectrum management device that is in the movable range of the cognitive radio system releasing the remaining spectrum resource is selected to form the cognitive radio system set corresponding to the remaining spectrum resource.

In the process of determining the cognitive radio system set in step S1030, the cognitive radio system for forming the cognitive radio system set may also be selected based on information on a time when a usage spectrum of each cognitive radio system is allocated. Preferably, in a case that the remaining spectrum resource is a spectrum resource newly released in the wireless communication system, a cognitive radio system, to which a usage spectrum is allocated at a time later than a time when the remaining spectrum resource is allocated to the cognitive radio system releasing the remaining spectrum resource, is selected from the cognitive radio systems managed by the spectrum management device, to form the cognitive radio system set corresponding to the remaining spectrum resource.

In step S1030, preferably, after preliminarily determining the cognitive radio system set, for each cognitive radio system in the cognitive radio system set, it is determined whether interference to the primary system falls within the permissible range of the primary system when the remaining spectrum resource is allocated for use by the cognitive radio system, and the cognitive radio system of which the interference to the primary range goes beyond the permissible range of the primary system is removed from the cognitive radio system set.

In step S1030, the method further includes: creating a diagraph based on the cognitive radio system set as a spectrum transition diagram, and determining spectrum transition information on the spectrum transition based on the spectrum transition diagram by using a depth-first search process or a breadth-first search process. The diagraph is created by: setting the cognitive radio system which releases the remaining spectrum resource or the spectrum management device as a tail node; setting each of the cognitive radio systems in the cognitive radio system set corresponding to the remaining spectrum resource as a head node; and setting the remaining spectrum resource as a weight of a directed side connecting the tail node and the head node.

The spectrum management method according to the present disclosure further includes: sending spectrum transition information on the spectrum transition, where the spectrum transition information includes an identifier of a cognitive radio system to perform a spectrum transition operation, information on spectrum resources newly allocated to the cognitive radio system and/or information on spectrum resources to be released by the cognitive radio system; and receiving at least one of spectrum usage information and spectrum transition capability information of the cognitive radio system managed by the spectrum management device, information on the remaining spectrum resource, information on a movable range of the cognitive radio system, and information on a time when usage spectrum of the cognitive radio system is allocated.

A method for a wireless communication system is further provided according to the present disclosure. The wireless communication system includes a geo-location database, a spectrum management device and a cognitive radio system.

The method includes: sending, by the geo-location database, spectrum usage information and spectrum transition capability information of the cognitive radio systems, wherein the spectrum usage information corresponds to information on usage spectrums allocated for use by the cognitive radio systems, and the spectrum transition capability information corresponds to information on whether the cognitive radio system supports a spectrum transition operation; receiving, by the spectrum management device, the spectrum usage information and the spectrum transition capability information of the managed cognitive radio systems, and determining, by the spectrum management device, spectrum transition to the cognitive radio systems managed by the spectrum management device based on the spectrum usage information and the spectrum transition capability information, so that the interference caused by spectrum usage of the cognitive radio systems to the primary system in the wireless communication system falls within the permissible range of the primary system; sending, by the spectrum management device, spectrum transition information on the spectrum transition; and receiving, by the cognitive radio system, the spectrum transition information sent by the spectrum management device, and adjusting, by the cognitive radio system, spectrum usage of the cognitive radio system with the spectrum a transition information.

Figure 19:
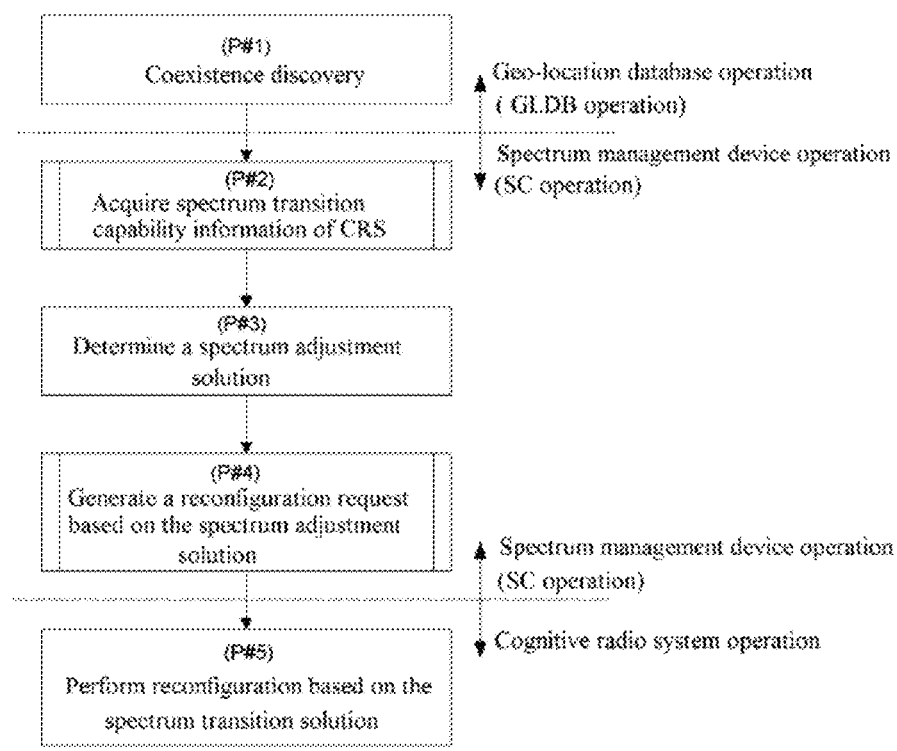
FIG. 19 is a flowchart showing a method for a wireless communication system according to an embodiment of the present disclosure.

FIG. 19 describes a flowchart of a method for a wireless communication system according to an embodiment of the present disclosure.

As shown in FIG. 19, in P#1, a geo-location database (GLDB) determines whether to trigger a spectrum transition operation to the cognitive radio system, which, for example, corresponds to the triggering of the transition operation of the processing circuit in the geo-location database described in the above embodiment, that is, coexistence discovery (the operation may also be performed by the transition triggering unit of the spectrum management device according to the embodiment of the present disclosure, for example). Then, in P#2, based on a result of the coexistence discovery, that is, based on determining to trigger spectrum transition to the cognitive radio system, the spectrum management device (SC) acquires spectrum transition capability information, which, for example, corresponds to the acquiring operation of the acquiring unit of the spectrum management device described in the above embodiment. In P#3, the spectrum management device determines a spectrum transition solution based on the acquired spectrum transition capability information of the cognitive radio system, and thus obtains spectrum transition information on the spectrum transition solution, which, for example, corresponds to a process of determining the spectrum transition information by the transition determining unit of the spectrum management device in the embodiment described above, including respective processes of the cognitive radio system set determining module and the judging module. In P#4, the spectrum management device generates a reconfiguration request based on the spectrum transition solution, and sends the reconfiguration request to a corresponding cognitive radio system together with the spectrum transition information, which, for example, corresponds to a process of sending the spectrum transition information by the communication unit of the spectrum management device in the embodiment described above. In P#5, the corresponding cognitive radio system reconfigures its spectrum usage based on the spectrum transition information.

Figure 20:
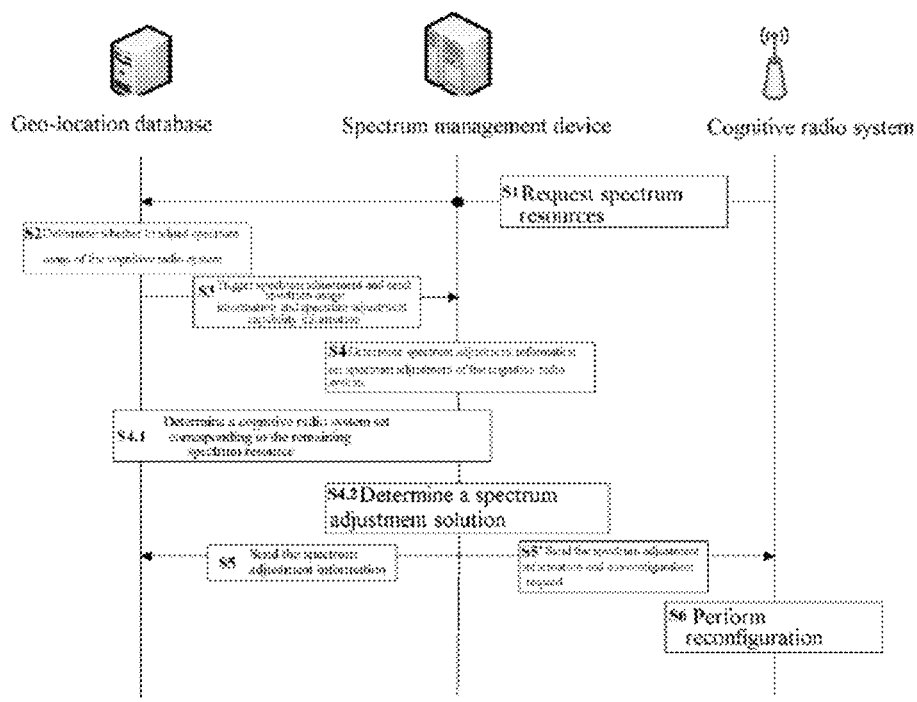
FIG. 20 is a flowchart showing an example of a method for a spectrum management system according to an embodiment of the present disclosure.

Hereinafter, a method for a wireless communication system is described in detail in to conjunction with FIG. 20.

In step S1, a cognitive radio system requesting a spectrum resource sends a spectrum resource request to a geo-location database (or a spectrum management device).

In step S2, in response to the spectrum resource request, the geo-location database determines whether to trigger the spectrum transition operation, which, for example, corresponds to the transition triggering operation of the processing circuit in the geo-location database described in the above embodiment (the operation may also be performed by the transition triggering unit of the spectrum management device according to the embodiment of the present disclosure, for example), and the specific operation is not repeated here.

In step S3, after it is determined to trigger the spectrum transition operation of the cognitive radio system, spectrum usage information and spectrum transition capability information of the cognitive radio systems are sent to the spectrum management device. The spectrum usage information corresponds to information on usage spectrum allocated for use by each cognitive radio system, and the spectrum transition capability information corresponds to information on whether the cognitive radio system supports the spectrum transition operation. For example, the operation in step S3 corresponds to the operation of the communication unit of the geo-location database described in the above embodiment, which is not repeated here.

In step S4, the spectrum management device receives spectrum usage information and spectrum transition capability information of the cognitive radio systems managed by the spectrum management device, and determines spectrum transition to the cognitive radio systems managed by the spectrum management device based on the spectrum usage information and the spectrum transition capability information, so that the interference caused by spectrum usage of the cognitive radio systems to the primary system in the wireless communication system falls within the permissible range of the primary system. Specifically, in step S4.1, the spectrum management device determines a cognitive radio system set corresponding to the remaining spectrum resource based on the spectrum usage information and the spectrum transition capability information of the cognitive radio systems, and sends information of the determined cognitive radio system set to the geo-location database; the geo-location database calculates interference to the primary system by each cognitive radio system in the cognitive radio system set and returns a calculation result to the spectrum management device; and the spectrum management device removes a cognitive radio system of which interference to the primary system goes beyond the permissible range of the primary system from the cognitive radio system set based on the received calculation result. In step S4.2, a spectrum transition solution is determined based on the determined cognitive radio system set. The process in step S4 corresponds to, for example, the operation regarding spectrum transition information of the transition determining unit in the spectrum management device in the embodiment described above, including respective operations of the cognitive radio system set determining module and the judging module, and the specific operations are not repeated here.

In step S5, the spectrum management device sends spectrum transition information on the spectrum transition solution to the geo-location database. In step S5', the spectrum management device sends the spectrum transition information on the spectrum transition solution to the cognitive radio system, and it may send a spectrum transition request to the corresponding cognitive radio system. It should be noted that, the spectrum transition information may be sent to the geo-location database and the cognitive radio system simultaneously or in sequence. The process of step S5, for example, corresponds to the process of sending spectrum transition information by the communication unit of the spectrum management device in the embodiment described above, and the specific operation is not repeated here.

In step S6, the cognitive radio system reconfigures its spectrum usage based on the received spectrum transition information.

Although the triggering of the transition operation in step S2 is performed by the geo-location database in the above description, the triggering of the transition operation may also be performed by the spectrum management device according to the embodiment of the spectrum management device described above.

Figure 21:
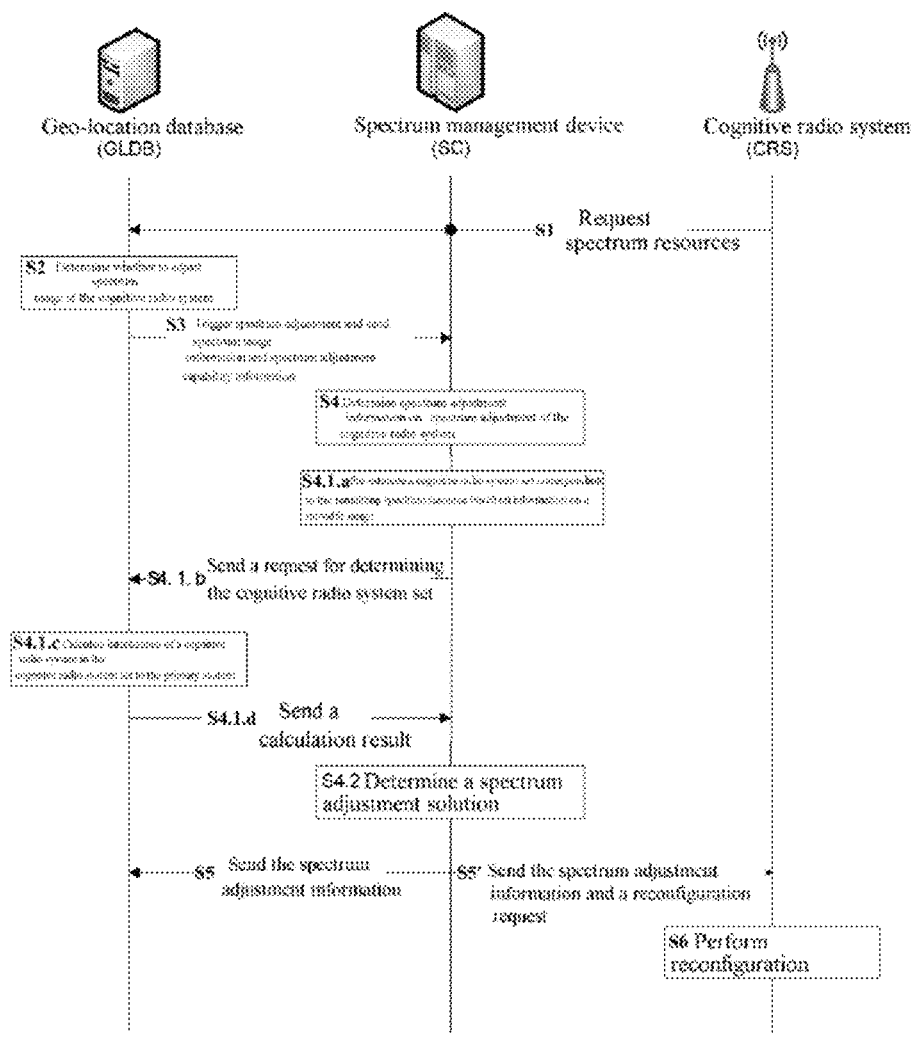
FIG. 21 and FIG. 22 show specific examples of a flowchart of a method for a wireless communication system.
Figure 22:
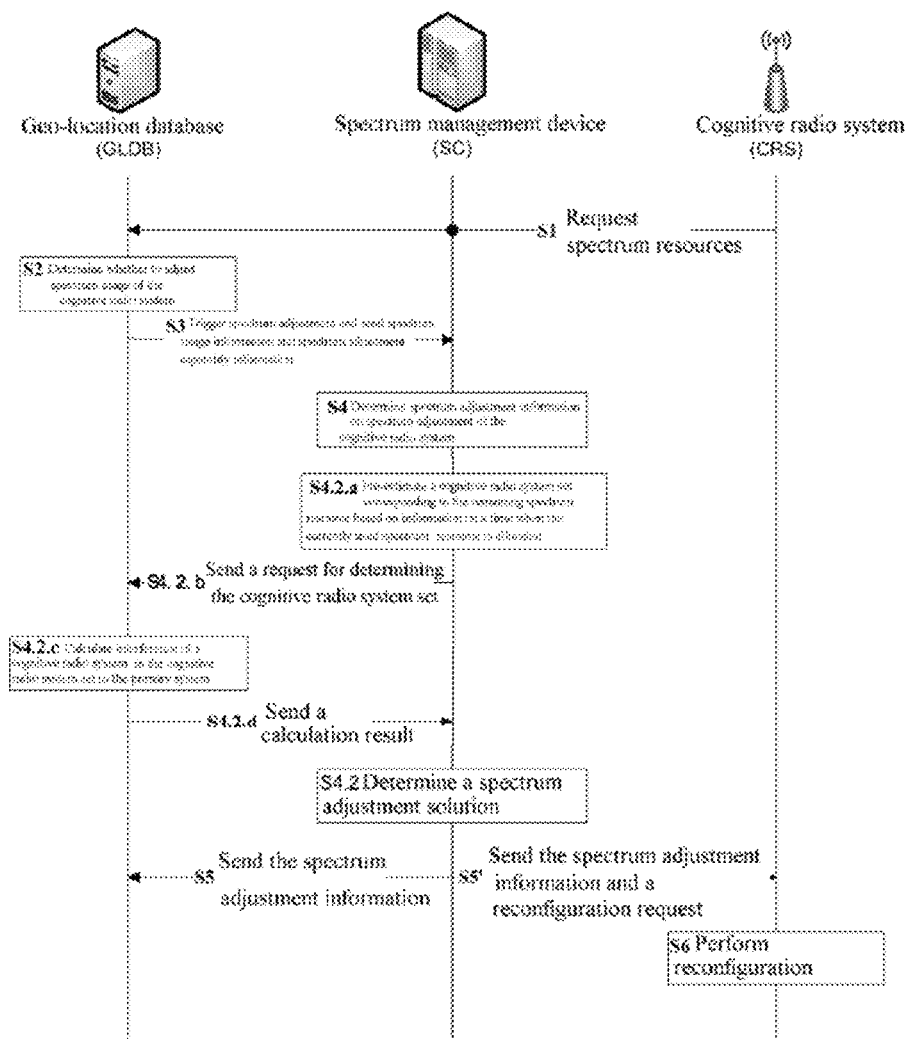

FIG. 21 and FIG. 22 show specific examples of a flowchart of a method for a wireless communication system.

As shown in FIG. 21, in step S1, a cognitive radio system requesting a spectrum resource sends a spectrum resource request to a geo-location database (or a spectrum management device). In step S2, in response to the spectrum resource request, the geo-location database determines whether to trigger a spectrum transition operation. In step S3, after it is determined to trigger the spectrum transition operation of the cognitive radio system, spectrum usage information and spectrum transition capability information of the cognitive radio systems are sent to the spectrum management device. The spectrum usage information corresponds to information on usage spectrum allocated for use by each cognitive radio system, and the spectrum adjust transition capability information corresponds to information on whether the cognitive radio system supports the spectrum transition operation. In step S4, based on the spectrum usage information and the spectrum transition capability information, spectrum transition to the cognitive radio systems managed by the spectrum management device is determined. In step S5, the spectrum management device sends the spectrum transition information on the spectrum transition solution to the geo-location database. In step S5', the spectrum transition device sends the spectrum transition information on the spectrum transition solution to the cognitive radio system, and it may also send a spectrum transition request to the corresponding cognitive radio system. In step S6, the cognitive radio system reconfigures its spectrum usage based on the received spectrum transition information. Except that the process in step S4.1 is described in detail as steps S4.1a to S4.1.d in the following, the process in FIG. 21 is similar to the flowchart of the method for the wireless communication system shown in FIG. 20. In the method for the wireless communication system shown in FIG. 21, in step S4.1.a, the spectrum management device pre-estimates a cognitive radio system set corresponding to the remaining spectrum resource based on information on movable ranges of the cognitive radio systems. In step S4.1.b, the spectrum management device sends a request for determining whether the pre-estimated cognitive radio system set is appropriate to the geo-location database, that is, requesting the geo-location database to calculate interference to the primary system when the newly released spectrum resource is allocated for use by each cognitive radio system in the pre-estimated cognitive radio system set. In step S4.1.c, in response to the request of the spectrum management device, the geo-location database calculates the interference to the primary system when the newly released spectrum resource is allocated for use by the cognitive radio system in the pre-estimated cognitive radio system set. In step S4.1.d, the calculation result or a result on whether the interference falls within the permissible range of the primary system determined based on the interference value is sent to the spectrum management device.

FIG. 22 is similar to FIG. 21 except that in step S4.1.a in FIG. 21, the spectrum management device pre-estimates a cognitive radio system set corresponding to the remaining spectrum resource based on information on movable ranges of the cognitive radio systems; while in step S4.2.a in FIG. 22, the spectrum management device pre-estimates a cognitive radio system set corresponding to the remaining spectrum resource based on the time when usage spectrums are allocated to the cognitive radio systems. For clarity, other steps in FIG. 22 are not described in detail here.

Compared with the conventional technology, the spectrum management device and method, the geo-location database, the coexistence discovery device and the cognitive radio system according to the embodiment of the present disclosure have at least one of the following beneficial effects: a spectrum transition solution between the cognitive radio system with the remaining spectrum resource and the cognitive radio system requesting the spectrum resource is determined based on the spectrum usage information and the spectrum transition capability information of the cognitive radio systems; and the solution is implemented, so that the involved cognitive radio systems are reconfigured, thereby achieving accessing of cognitive radio systems as many as possible with reconfiguration overheads as small as possible, and utilizing the resource efficiently.

Specific Application

First Example

Presently, there are a large number of standards configured to solve the problem of a low resource utilization rate by coexistence management, and IEEE P802.19a is one of the standards. Main logic entities of the spectrum management system for the standard include: a spectrum management database (SMD) which corresponds to the transition determining unit of the spectrum management device according to the embodiment of the present disclosure and is configured to allocate spectrum resources for GCO based on location information; a coexistence discovery and information server (CDIS), which corresponds to the coexistence discovery device according to the embodiment of the present disclosure and is configured to discover a geolocation capability object (GCO) which may affect the performance of the served GCO for coexistence managers (CM), and trigger the CM to perform coexistence managing, a coexistence manager, which for example corresponds to the spectrum management device according to the embodiment of the present disclosure and is configured to provide coexistence management; and the geolocation capability object, which for example corresponds to the cognitive radio system according to the embodiment of the present disclosure and indicates a single device or a network consist of multiple devices, where the device operates based on the authenticated geolocation capability and acquires coexistence service from CM.

The present disclosure may also be applied to IEEE P802.19a. The corresponding rule is as follows. The SMD is configured to allocate spectrum resources or recalculate availability of the spectrum resources for GCOs. The CDIS is configured to perform coexistence discovery and trigger the CM to determine the spectrum transition solution. The CM sends transition requests to the GCOs based on the result, and the GCOs complete the reconfiguration based on the requests. The GCOs have different priorities. When aggregation interference to a GCO with a high priority is controlled in its permissible range, a GCO with a low priority can obtain resources.

Figure 23:
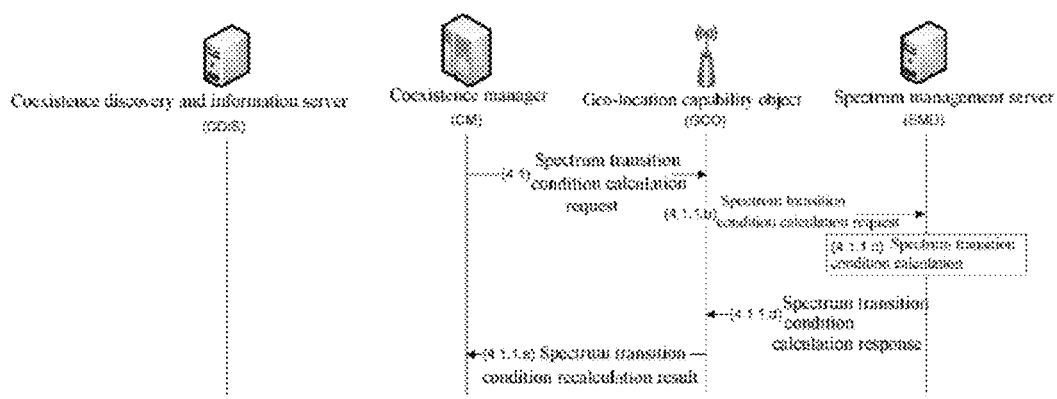
FIG. 23 is a schematic diagram showing an application example of a spec rum management system according to an embodiment of the present disclosure.

It should be particularly noted that, there is no direct information transmission interface between the CM and the SMD. FIG. 23 shows a flowchart for a spectrum management system according to an application example of the present disclosure. When the CM needs to obtain a calculation result of the spectrum transition condition (that is, acquiring the cognitive radio system set corresponding to the remaining spectrum resource described above (and thus creating a spectrum transition diagram)). As shown in FIG. 23, firstly, the CM sends a calculation request for the spectrum transition condition (for example, the request includes spectrum request group information parameters (indicated by specRequestModification), wherein the parameters include an ID (indicated by groupIndex) of the spectrum request group, and a spectrum to be checked (indicated by spectrumCheck)) to the GCO, and the GCO requests the recalculation to the SMD. The SMD calculates the spectrum transition condition and sends the calculation result to the GCO, and the GCO uploads the result to the CM.

Second Example

The method may also be applied to spectrum access system (SAS) regarding multi-level coexistence system management for the 3.5 GHz system. In USA, the 3.5 GHz frequency band is always used for Department of Defense (DoD) radar system. Presently, the Federal Communications Commission (FCC) discusses to use the frequency band in commercial by sharing the spectrum. The sharing system is a part of the SAS, and includes three levels. An incumbent user represents a highest level, and it should be ensured that no harmful interference of Citizens Broadband Radio Service users is caused to the incumbent user. The incumbent user includes the DoD radar system, Fixed Satellite Service (FSS), and grandfathered terrestrial wireless operations in a limited time. The citizens broadband radio service includes two levels, i.e. priority access license (PAL) and general authorized access (GAA), and it should be ensured that the PLA does not suffer the harmful interference from the GAA. In a case that the spectrum resource manager manages resource coexistence between incumbent, PAL and GAA, the source utilization efficiency can also be improved with the above method. For example, when a new GAA joins, if no available source can be directly obtained due to the resource allocation result, resource allocation between GAAs can be adjusted as little as possible to achieve accessing of the new GAA in while protecting incumbent and PAL.

Application Example of User Equipment

First Application Example

Figure 24:
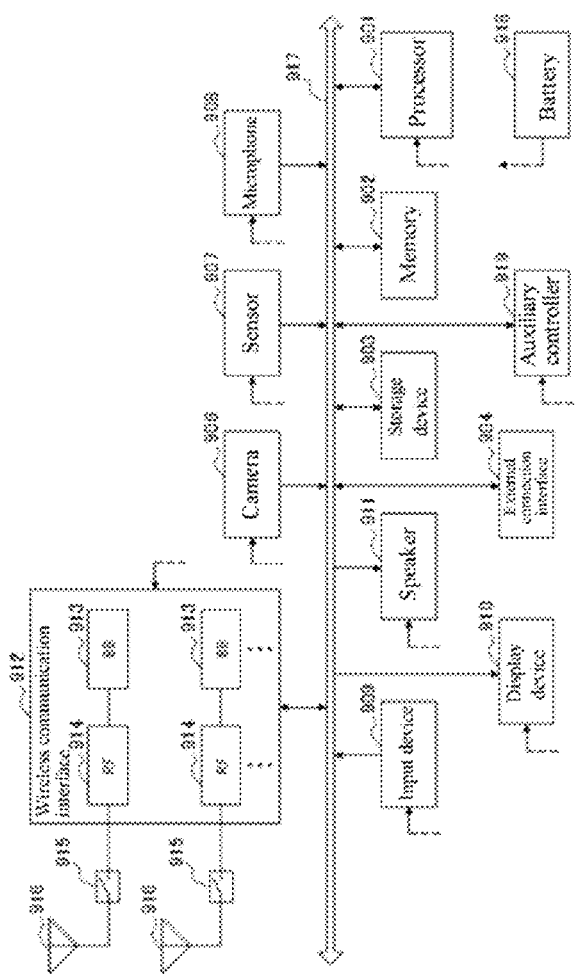
FIG. 24 is a block diagram showing an example of a schematic confirmation of a slum hone to which the technology according to the present disclosure may be applied.

FIG. 24 is a block diagram showing an example of a schematic configuration of a smut phone 900 to which the technology of the present disclosure may be applied. The smart phone 900 includes a processor 901, a memory 902, a storage device 903, an external connection interface 904, a camera 906, a sensor 907, a microphone 908, an input device 909, a display device 910, a loudspeaker 911, a wireless communication interface 912, one or more antenna switches 915, one or more antennas 916, a bus 917, a battery 918 and an auxiliary controller 919.

The processor 901 may be for example a CPU or a system on chip (SoC), and control functions of an application layer and other layers of the smart phone 900. The memory 902 includes an RAM and an ROM, and stores programs executed by the processor 901 and data. The storage device 903 may include a storage medium, such as a semiconductor memory and a hard disk. The external connection interface 904 is an interface configured to connect an external apparatus (such as a memory card and a universal serial bus (USB) device) to the smart phone 900.

The camera 906 includes an image sensor (such as a charge coupled device (CCD) and a complementary metal oxide semiconductor (CMOS)) and generates a captured image. The sensor 907 may include a set of sensors, such as a measurement sensor, a gyroscope sensor, a geomagnetic sensor and an acceleration sensor. The microphone 908 converts sound inputted into the smart phone 900 into an audio signal. The input device 909 includes for example a touch sensor configured to detect touch on a screen of the display device 910, a keypad, a keyboard, a button or a switch, and receives an operation or information inputted from a user. The display device 910 includes a screen (such as a liquid crystal display (LCD) and an organic light emitting diode (OLED) display), and displays an output image of the smart phone 900. The loudspeaker 911 converts the audio signal outputted from the smart phone 900 into sound.

The wireless communication interface 912 supports any cellular communication scheme (such as LTE and LTE-advanced), and performs wireless communication. The wireless communication interface 912 may generally include for example a BB processor 913 and an RE circuit 914. The BB processor 913 may perform encoding/decoding, modulating/demodulating and multiplexing/de-multiplexing for example, and perform various types of signal processing for wireless communication. Meanwhile, the RF circuit 914 may include for example a mixer, a filter and an amplifier, and transmits and receives a wireless signal via an antenna 916. The wireless communication interface 912 may be a chip module on which a BB processor 913 and the RF circuit 914 are integrated. As shown in FIG. 24, the wireless communication interface 912 may include multiple BB processors 913 and multiple RE circuits 914. Although FIG. 24 shows an example in which the wireless communication interface 912 includes multiple BB processors 913 and multiple RF circuits 914, the wireless communication interface 912 may include a single BB processor 913 or a single RF circuit 914.

In addition to the cellular communication scheme, the wireless communication interface 912 may support other types of wireless communication schemes, such as a short distance wireless communication scheme, a near field communication scheme and a wireless local area network (LAN) scheme. In this case, the wireless communication interface 912 may include a BB processor 913 and an RF circuit 914 for each type of wireless communication scheme.

Each of the antenna switches 915 switches a connection destination of the antenna 916 between multiple circuits (for example circuits for different wireless communication schemes) included in the wireless communication interface 912.

Each of the antennas 916 includes a single or multiple antenna elements (such as multiple antenna elements included in the MIMO antenna), and is used for the wireless communication interface 912 to transmit and receive a wireless signal. As shown in FIG. 24, the smart phone 900 may include multiple antennas 916. Although FIG. 24 shows an example in which the smart phone 900 includes multiple antennas 916, the smart phone 900 may include a single antenna 916.

In addition, the smart phone 900 may include an antenna 916 for each type of wireless communication scheme. In this case, the antenna switch 915 may be omitted from the configuration of the smart phone 900.

The bus 917 connects the processor 901, the memory 902, the storage device 903, the external connection interface 904, the camera 906, the sensor 907, the microphone 908, the input device 909, the display device 910, the loudspeaker 911, the wireless communication interface 912 and the auxiliary controller 919 with each other. The battery 918 supplies power for blocks in the smart phone 900 shown in FIG. 24 via a feeder which is indicated partially as a dashed line in the figure. The auxiliary controller 919 controls a minimum necessary function for operating the smart phone 900 in a sleeping mode, for example.

In the smart phone 900 shown in FIG. 24, the communication unit 60 described with reference to FIG. 13 may be implemented by the wireless communication interface 912. At least a part of the functions may be implemented by the processor 901 or the auxiliary controller 919.

Second Application Example

Figure 25:
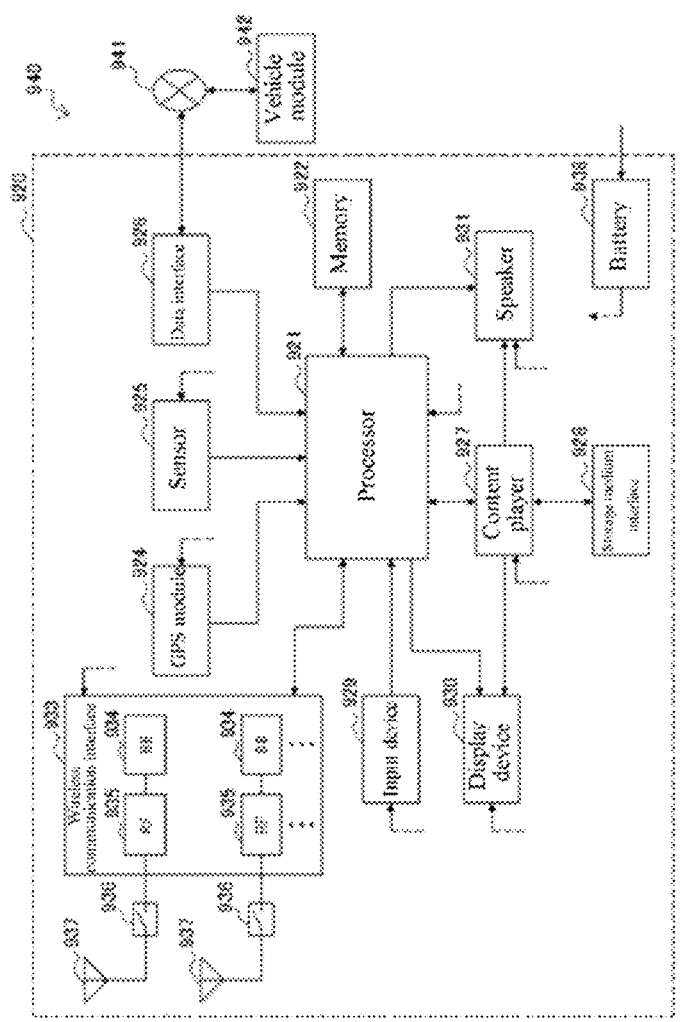
FIG. 25 is a block diagram showing an example of a schematic configuration of a vehicle navigation device to which the technology according to the present disclosure may be applied.

FIG. 25 is a block diagram showing an example of a schematic configuration of a vehicle navigation device 920 to which the technology of the present disclosure may be applied. The vehicle navigation device 920 includes a processor 921, a memory 922, a global positioning system (GPS) module 924, a sensor 925, a data interface 926, a content player 927, a storage medium interface 928, an input device 929, a display device 930, a loudspeaker 931, a wireless communication interface 933, one or more antenna switches 936, one or more antennas 937 and a battery 938.

The processor 921 may be for example a CPU or an SoC and control a navigation function and other functions of the vehicle navigation device 920. The memory 922 includes an RAM and an ROM, and stores programs executed by the processor 921 and data.

The GPS module 924 measures a position of the vehicle navigation device 920 (such as a latitude, a longitude and an altitude) by using a GPS signal received from a GPS satellite. The sensor 925 may include a set of sensors, such as a gyroscope sensor, a geomagnetic sensor and an air pressure sensor. The data interface 926 is connected to an on-vehicle network 941 for example through a terminal not shown, and acquires data generated by the vehicle (such as vehicle speed data).

The content player 927 reproduces contents stored in a storage medium (such as a CD and a DVD), wherein the storage medium is inserted into the storage medium interface 928. The input device 929 includes for example a touch sensor configured to detect touch on a screen of the display device 930, a button or a switch, and receives an operation or information inputted from a user. The display device 930 includes a screen of an LCD or OLED display for example, and displays an image with a navigation function or the reproduced content. The loudspeaker 931 outputs a sound with a navigation function or the reproduced content.

The wireless communication interface 933 supports any cellular communication scheme (such as LTE and LTE-advanced), and performs wireless communication. The wireless communication interface 933 may generally include a BB processor 934 and an RF circuit 935 for example. The BB processor 934 may perform for example encoding/decoding, modulating/demodulating and multiplexing/demultiplexing, and perform various types of signal processing for wireless communication. Meanwhile, the RF circuit 935 may include for example a mixer, a filter and an amplifier; and transmit and receive a wireless signal via the antenna 937. The wireless communication interface 933 may also be a chip module on which the BB processor 934 and the RF circuit 935 are integrated. As shown in FIG. 25, the wireless communication interface 933 may include multiple BB processors 934 and multiple RE circuits 935. Although FIG. 25 shows an example in which the wireless communication interface 933 includes multiple BB processors 934 and multiple RF circuits 935, the wireless communication interface 933 may include a single BB processor 934 or a single RF circuit 935.

In addition to the cellular communication scheme, the wireless communication interface 933 may support other types of wireless communication schemes, such as a short distance wireless communication scheme, a near field communication scheme and a wireless LAN scheme. In this case, the wireless communication interface 933 may include the BB processor 934 and the RF circuit 935 for each type of wireless communication scheme.

Each of the antenna switches 936 switches a connection destination of the antenna 937 between multiple circuits (such as circuits for different wireless communication schemes) included in the wireless communication interface 933.

Each of the antennas 937 includes a single or multiple antenna elements (such as multiple antenna elements included in the MIMO antenna), and is used for the wireless communication interface 933 to transmit and receive a wireless signal. As shown in FIG. 25, the vehicle navigation device 920 may include multiple antennas 937. Although FIG. 25 shows an example in which the vehicle navigation device 920 includes multiple antennas 937, the vehicle navigation device 920 may include a single antenna 937.

In addition, the vehicle navigation device 920 may include the antenna 937 for each type of wireless communication scheme. In this case, the antenna switch 936 may be omitted from the configuration of the vehicle navigation device 920.

The battery 938 supplies power for blocks in the vehicle navigation device 920 shown in FIG. 25 via a feeder which is indicated partially as a dashed line in the figure. The battery 938 accumulates power provided by the vehicle.

In the vehicle navigation device 920 shown in FIG. 25, the communication unit described with reference to FIG. 13 may be implemented by the wireless communication interface 933. At least a part of the functions may be implemented by the processor 921.

The technology of the present disclosure may be implemented as an on-vehicle system (or a vehicle) 940 including one or more of the vehicle navigation device 920, the on-vehicle network 941 and a vehicle module 942. The vehicle module 942 generates vehicle data (such as a vehicle speed, an engine speed and fault information), and outputs the generated data to the on-vehicle network 941.

Basic principles of the present disclosure are described above in conjunction with specific embodiments. However, it should be noted that for those skilled in the art, all or any step or component of the method and device according to the present disclosure may be implemented in a form of hardware, firmware, software or a combination thereof in any computing device (including a processor and a storage medium) or a network of the computing device, and those skilled in the art can achieve the step or the component by using basic circuit design knowledge or basic programming skill once reading the description of the present disclosure.

In addition, a program product storing machine readable instruction codes is further provided according to the present disclosure. The method according to the embodiment of the present disclosure may be performed when the instruction codes are read and performed by the machine.

Accordingly, a storage medium for carrying the program product storing the machine readable instruction codes is further provided according to the present disclosure. The storage medium includes but not limited to a floppy disk, an optical disk, a magneto-optical disk, a storage card or a memory stick.

In a case of implementing the present disclosure by software or firmware, programs consisting the software are installed into a computer with a dedicated hardware structure from a storage medium (such as a general-purpose computer 2500 shown in FIG. 26) or a network. When the computer is installed with various programs, the computer can perform various functions.

Figure 26:
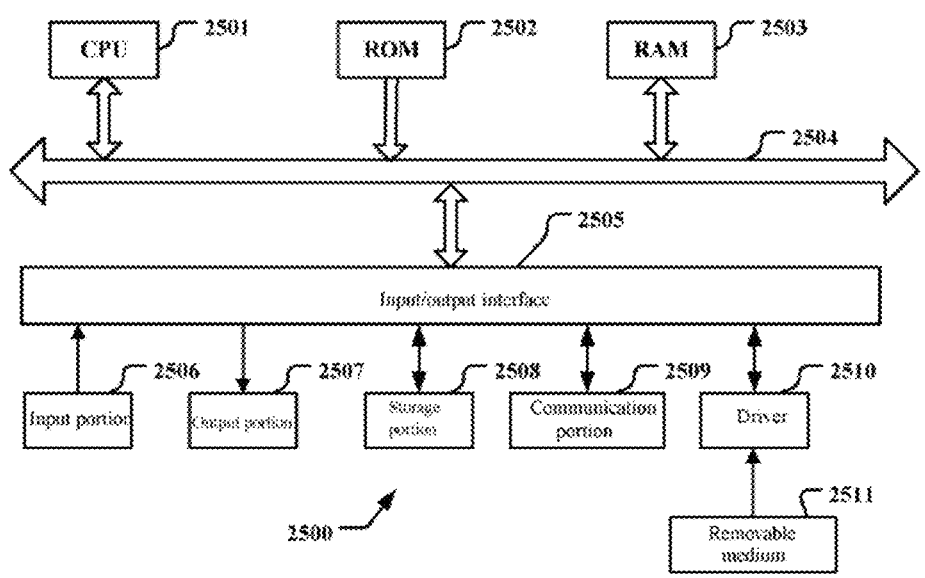
FIG. 26 is a block diagram of an exemplary structure of a general-purpose personal computer which can implement the method, device and/or system according to the embodiment of the present disclosure.

As shown in FIG. 26, the central processing unit (CPU) 2501 performs various processing based on programs stored in a read only memory (ROM) 2502 or programs loaded to a random access memory (RAM) 2503 from a storage portion 2508. In the RAM 2503, data required for performing various processing by the CPU 2501 is also stored as needed. The CPU 2501, the ROM 2502 and the RAM 2503 are connected to each other via a bus 2504. An input/output interface 2505 is also connected to the bus 2504.

The following components are connected to the input/output interface 2505: an input portion 2506 (including a keyboard, a mouse and so on), an output portion 2507 (including a display, such as a cathode ray tube (CRT), a liquid crystal display (LCD), and the like, and a loudspeaker), a storage portion 2508 (including a hard disk and the like), and a communication portion 2509 (including a network interface card, such as a LAN card, a modem, and the like). The communication portion 2509 performs communication processing via a network such as the Internet. A driver 2510 may also be connected to the input/output interface 2505 as needed. A removable medium 2511 such as a magnetic disc, an optical disc, a magneto-optical disc, a semiconductor memory, or the like is installed in the driver 2510 as needed, such that the computer program read therefrom is installed in the storage portion 2508 as needed.

In the case that the above series of processing are performed by software, programs constituting the software are installed from a network such as the Internet or a storage medium such as a removable medium 2511.

Those skilled in the art should understand that, the storage medium is not limited to the removable medium 2511 shown in FIG. 26, which stores programs and is distributed separately from the device to provide programs for the user. Examples of the removable medium 2511 include: a magnetic disc (including a floppy disc (registered trademark)), an optical disc (including a compact disc read only memory (CD-ROM) and a digital versatile disc (DVD)), a magneto-optical disc (including a mini disc (MD) (registered trademark)) and a semiconductor memory. Alternatively, the storage medium may be a hard disc included in storage portion 2508, the ROM 2502, or the like, which stores programs, and it is distributed to the user together with the devices containing it.

It should be further noted that, in the devices, methods and systems according to the present disclosure, components or steps may be decomposed and/or recombined. The decomposition and/or recombination should be regarded as equivalent solutions of the present disclosure. In addition, steps in the series of processing described above may be performed naturally in an order of description and in a time order, and may be not necessarily performed in the time order. Some steps may be performed in parallel or independently from each other.

At last, it should be noted that terms of "include", "comprise" or any other variants are intended to be non-exclusive. Therefore, a process, method article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

Although the embodiments of the present disclosure are described above in detail in conjunction with the drawings, it should be understood that the embodiments described above are only used to illustrate the present invention and are not intended to limit the present invention. For those skilled in the art, various types of changes and modifications may be made to the embodiments without departing from the essence and scope of the present invention. Therefore, the scope of the present invention is defined by only the appended claims and equivalent meaning thereof.

The components and units of the above device may be implemented by software, firmware, hardware or a combination thereof. The specific means or manners for implementing are well-known for those skilled in the art, which are not described here. In a case of implementing them by software or firmware, programs constituting the software are installed into a computer with a dedicated hardware structure from a storage medium or a network. The computer can achieve various functions when installed with various programs.

In a case of implementing the series of processing above by software, the programs constituting the software are installed from a network such as the Internet or a storage medium such as a removable medium.

Those skilled in the art should understand that, the storage medium is not limited to the removable medium, which stores programs and is distributed separately from the device to provide programs for the user. Examples of the removable medium include: a magnetic disc (including a floppy disc (registered trademark)), an optical disc (including a compact disc read only memory (CD-ROM) and a digital versatile disc (DVD)), a magnetic-optical disc (including a mini disc (MD) (registered trademark)) and a semiconductor memory. Alternatively, the storage medium may be a hard disc included in storage portion, the ROM, or the like, which stores programs, and it is distributed to the user together with the device containing it.

A program product storing machine readable instruction codes is further provided according to the present disclosure. The method according to the embodiment of the present disclosure is performed when the instruction codes are read and executed by a machine.

Accordingly, a storage medium for carrying the program product storing the machine readable instruction codes is further provided according to the present disclosure. The storage medium includes but not limited to a floppy disk, an optical disk, a magneto-optical disk, a storage card or a memory stick.

Finally, it should be noted that the relationship terminologies such as "left", "right", "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also includes the elements inherent for the process, method, article or device. Unless expressively limited otherwise, the statement "comprising (including) one . . . " does not exclude the case that other similar elements may exist in the process, method, article or device.

Although the present disclosure is disclosed by its specific embodiments described above, it should be understood that those skilled in the art may make various changes, improvements or equivalents to the present disclosure within the spirit and range of the appended claims. The changes, improvements or equivalents should be regarded as falling within the claimed scope of protection of the present disclosure.

The invention claimed is:

1. A spectrum management device for a wireless communication system comprising a primary system and a cognitive radio system, the spectrum management device comprising:
a processing circuit configured to:
acquire spectrum usage information and spectrum transition capability information of the cognitive radio system managed by the spectrum management device, wherein the spectrum usage information corresponds to information on a usage spectrum allocated for use by each cognitive radio system, and the spectrum transition capability information comprises information on whether the cognitive radio system supports a spectrum transition operation, wherein a value of the spectrum transition capability information is indicated by a Boolean value; and
determine spectrum transition to each cognitive radio system managed by the spectrum management device based on the spectrum usage information and the spectrum transition capability information, so that interference caused by spectrum usage of cognitive radio system to the primary system falls within a permissible range of the primary system.

2. The spectrum management device according to claim 1, wherein the processing circuit is farther configured to:
in a case that there is a cognitive radio system making a request for a spectrum resource and there is a remaining spectrum resource in the wireless communication system that is unavailable to the cognitive radio system making the request for the spectrum resource without any change to spectrum resource allocation of other cognitive radio systems, acquire the spectrum usage information of the cognitive radio system managed by the spectrum management device in response to the request, and determine whether to trigger the spectrum to each cognitive radio system managed by the spectrum management device based on the spectrum usage information and the spectrum transition capability information.

3. The spectrum management device according to claim 2, wherein the remaining spectrum resource comprises at least one of a spectrum resource unused and a newly released spectrum resource in the wireless communication system.

4. The spectrum management device according to claim 2, wherein the processing circuit is further configured to:
in a case that it is determined to trigger the spectrum transition to the cognitive radio system in the wireless communication system, acquire the spectrum transition capability information of each cognitive radio system, and determine the spectrum transition to the cognitive radio system which supports the spectrum transition operation based on the spectrum transition capability information.

5. The spectrum management device according to claim 2, wherein the processing circuit is configured to:
(i) for the remaining spectrum resource, select the cognitive radio system from the cognitive radio systems managed by the spectrum management device to form a cognitive radio system set corresponding to the remaining spectrum resource, wherein the cognitive radio system in the cognitive radio system set does not use the remaining spectrum resource, and the interference of the cognitive radio system to the primary system falls within the permissible range of the primary system in a case that the remaining spectrum resource is allocated for use by the cognitive radio system;
(ii) judge whether there is the cognitive radio system making the request for the spectrum resource in the cognitive radio system set:
in a case of a positive judgment, determine the spectrum to the cognitive radio system managed by the spectrum management device based on the judgment; or
in a case of a negative judgment, set the spectrum resource currently used by each cognitive radio system in the cognitive radio system set to be the remaining spectrum resource:
for the spectrum resource currently used by each cognitive radio system in the cognitive radio system set, repeat operations in (i)-(ii), until there is the cognitive radio system making the request for the spectrum resource in the cognitive radio system set.

6. The spectrum management device according to claim 5, wherein the processing circuit is configured to allocate no spectrum resource to the cognitive radio system making the request for the spectrum resource in a case that there is still no cognitive radio system making the request for the spectrum resource in the cognitive radio system set when the operations in (i)-(ii) have been repeated for a predetermined threshold times.

7. The spectrum management device according to claim 5, wherein the processing circuit is configured to:
select the cognitive radio system for forming the cognitive radio system set based on available spectrum information of each cognitive radio system managed by the spectrum management device, wherein the available spectrum information is information on a spectrum available to the cognitive radio system in a case that the interference of the cognitive radio system to the primary system falls within the permissible range of the primary system.

8. The spectrum management device according to claim 5, wherein the processing circuit is configured to:
select the cognitive radio system for forming the cognitive radio system set based on information on a movable range of each cognitive radio system relative to each primary system in a case that the interference of the cognitive radio system to the primary system falls within the permissible range of the primary system while maintaining the current spectrum resource usage.

9. The spectrum management device according to claim 8 wherein
the remaining spectrum resource is a newly released spectrum resource the wireless communication system; and
the processing circuit is configured to:
select a cognitive radio system within the movable range of the cognitive radio system which releases the remaining spectrum resource, from the cognitive radio systems managed by the spectrum management device, for forming the cognitive radio system set corresponding to the remaining spectrum resource.

10. The spectrum management device according to claim 9, wherein the processing circuit is configured to:
in a case that the wireless communication system comprises more than one primary systems, select a cognitive radio system within an overlapped area of a plurality of movable ranges of the cognitive radio system which releases the remaining spectrum resource, for forming the cognitive radio system set corresponding to the remaining spectrum resource.

11. The spectrum management device according to claim 8, wherein the processing circuit is configured to, after the cognitive radio system for forming the cognitive radio system set corresponding to the remaining spectrum resource is selected:
determine, for each cognitive radio system in the cognitive radio system set, whether the interference of the cognitive radio system to the primary system falls within the permissible range of the primary system in a case that the remaining spectrum resource is allocated for use by the cognitive radio system; and
remove, from the cognitive radio system set, the cognitive radio system of which the interference to the primary system is beyond the permissible range of the primary system.

12. The spectrum management device according to claim 5, wherein the processing circuit is configured to:
select the cognitive radio system for forming the cognitive radio system set based on information on a time when the usage spectrum of each cognitive radio system is allocated.

13. The spectrum management device according to claim 5, wherein the processing circuit is further configured to:
create a diagraph based on the cognitive radio system set as a spectrum transition graph; and
determine spectrum transition information on the spectrum transition based on the spectrum transition graph by using a depth-first search process or a breadth-first search process,
wherein the diagraph is created by:
setting the cognitive radio system which releases the remaining spectrum resource or the spectrum management device as a tail node;
setting each of the cognitive radio systems in the cognitive radio system set corresponding to the remaining spectrum resource as a head node; and
setting the remaining spectrum resource as a weight of a directed side connecting the tail node and the head node.

14. The spectrum management device according to claim 1, further comprising: a communication circuit configured to send spectrum transition information on the spectrum transition, wherein the spectrum transition information comprises an identifier of the cognitive radio system to perform the spectrum transition operation, information on the spectrum resource newly allocated to the cognitive radio system and/or information on the spectrum resource to be released by the cognitive radio system.

15. The spectrum management device according to claim 14, wherein the communication circuit is further configured to receive at least one of the spectrum usage information and the spectrum transition capability information of the cognitive radio system managed by the spectrum management device, information on a remaining spectrum resource in the wireless communication system, information on a movable range of the cognitive radio system, and information on a time when the usage spectrum of the cognitive radio system is allocated.

16. A cognitive radio system for a wireless communication system, comprising:
a communication circuit configured to send spectrum usage information and spectrum transition capability information of the cognitive radio system for determining spectrum transition to the cognitive radio system based on the spectrum usage information and the spectrum transition capability information, and receive spectrum transition information for adjusting spectrum usage of the cognitive radio system,
wherein the spectrum usage information corresponds to information on a usage spectrum allocated for use by each cognitive radio system, and the spectrum transition capability information corresponds to information on whether the cognitive radio system supports a spectrum transition operation and a value of the spectrum transition capability information is indicated by a Boolean value.

17. The cognitive radio system according to claim 16, wherein
the spectrum transition information comprises an identifier of the cognitive radio system to perform the spectrum transition operation, information on the spectrum resource newly allocated to the cognitive radio system and/or information on the spectrum resource to be released by the cognitive radio system; and
the cognitive radio system is configured to adjust the spectrum usage of the cognitive radio system based on the spectrum transition information.

18. The cognitive radio system according to claim 16, wherein the communication circuit is further configured to send a spectrum resource request for making the request for a spectrum resource.

19. A coexistence discovery device for a wireless communication system comprising a primary system and a cognitive radio system, the coexistence discovery device comprising:
a processing circuit configured to, in a case that there is a cognitive radio system making a request for a spectrum resource and there is a remaining spectrum resource in the wireless communication system that is unavailable to the cognitive radio system making the request for the spectrum resource without any change to spectrum resource allocation of other cognitive radio systems, determine whether to trigger spectrum transition to the cognitive radio system in the wireless communication system in response to the request, so that a spectrum management device for managing the cognitive radio system acquires spectrum transition capability information of the cognitive radio system managed by the spectrum management device in a case that it is determined to trigger the spectrum transition to the cognitive radio system in the wireless communication system, and determines spectrum transition to the cognitive radio system managed by the spectrum management device based on the spectrum transition capability information of the cognitive radio system, with the spectrum transition capability information corresponding to information on whether the cognitive radio system supports a spectrum transition operation and a value of the spectrum transition capability information is indicated by a Boolean value.

20. A spectrum management method for a wireless communication system comprising a primary system and a cognitive radio system, the spectrum management method comprising:

acquiring spectrum usage information and spectrum transition capability information of the cognitive radio system managed by a spectrum management device, wherein the spectrum usage information corresponds to information on a usage spectrum allocated for use by each cognitive radio system, and the spectrum transition capability information corresponds to information on whether the cognitive radio system supports a spectrum transition operation; and determining spectrum transition to the cognitive radio system managed by the spectrum management device based on the spectrum usage information and the spectrum transition capability information, so that interference caused by spectrum usage of each cognitive radio system to the primary system falls within a permissible range of the primary system, wherein a value of the spectrum transition capability information is indicated by a Boolean value.

* * * * *